(12) United States Patent
Irikura

(10) Patent No.: US 7,841,429 B2
(45) Date of Patent: Nov. 30, 2010

(54) HYDRAULIC TRANSAXLE

(75) Inventor: Koji Irikura, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 116 days.

(21) Appl. No.: 12/370,436

(22) Filed: Feb. 12, 2009

(65) Prior Publication Data
US 2009/0145124 A1   Jun. 11, 2009

Related U.S. Application Data

(63) Continuation of application No. 11/132,440, filed on May 19, 2005, now Pat. No. 7,510,035.

(51) Int. Cl.
*B60K 7/01* (2006.01)
(52) U.S. Cl. ...................... 180/6.48; 180/6.3
(58) Field of Classification Search .......... 180/63, 180/6.48, 308; 60/484, 485, 487; 417/269, 417/307
See application file for complete search history.

(56) References Cited

U.S. PATENT DOCUMENTS

| 5,528,958 | A | 6/1996 | Hauser |
| 5,836,159 | A | 11/1998 | Shimizu et al. |
| 6,109,032 | A | 8/2000 | Shimizu et al. |
| 6,467,265 | B1 | 10/2002 | Abend |
| 6,508,059 | B1 * | 1/2003 | Takada et al. ............ 60/454 |
| 7,082,759 | B1 | 8/2006 | Tsukamoto et al. |
| 7,246,670 | B2 | 7/2007 | Hayashi et al. |

FOREIGN PATENT DOCUMENTS

JP    5-51487    8/1993

* cited by examiner

*Primary Examiner*—Tony H. Winner
(74) *Attorney, Agent, or Firm*—Sterne, Kessler, Goldstein & Fox P.L.L.C.

(57) ABSTRACT

A hydraulic transaxle comprises: a housing having a fluid sump therein, the housing including mutually joined housing parts; a pair of first wheels disposed at one of front and rear portions of the vehicle; an axle disposed in the housing; a center section disposed in the housing, the center section being formed therein with a pair of fluid ducts; a hydraulic pump disposed in the housing, fitted to the center section, and communicating with the fluid ducts; and a hydraulic motor disposed in the housing, fitted to the center section, and communicating with the fluid ducts so as to be fluidly connected to the hydraulic pump. The hydraulic motor includes a cylindrical motor shaft relatively rotatably and coaxially penetrated by the axle and drivingly connected to the axle.

4 Claims, 29 Drawing Sheets

(a)

(b)

(a)

(b)

(a)

(b)

HYDRAULIC TRANSAXLE

CROSS-REFERENCE TO RELATED APPLICATIONS

This application is a continuation of U.S. application Ser. No. 11/132,440, filed May 19, 2005, now U.S. Pat. No.7,510,035 B1 the entire disclosure of which is incorporated herein by reference thereto.

BACKGROUND OF THE INVENTION

1. Field of the Invention

The present invention relates to an integral hydraulic transaxle (hereinafter, "IHT"), including a hydrostatic stepless transmission (hereinafter, "HST") and an axle driven by the HST, improved in minimization, expansion of a neutral zone of the HST, and moderation of hydraulic pressure change.

2. Related Art

Conventionally, there is an assembly named as "IHT", including an axle, a hydraulic pump and a hydraulic motor for driving the axle. The hydraulic pump and motor are fluidly connected to each other so as to constitute an HST. The IHT may include an axle housing supporting the axle therein. Each of the hydraulic pump and motor may be disposed in or out of the axle housing.

Japanese Patent Publication No. Hei 5-51487 discloses an example of the IHT, whose housing includes a center plate and a pair of left and right axle housing parts. The axle housing parts journaling respective axles are joined to respective left and right opposite side surfaces of the center plate so as to sandwich the center plate therebetween. The axles are disposed perpendicular to the center plate and rotatably supported at proximal ends thereof in the center plate. Also, the axles project laterally outward from the respective axle housing parts.

In the IHT, a hydraulic motor is disposed in one of the axle housing parts, and slidably rotatably fitted onto the side surface of the center plate so as to be fluidly connected to fluid ducts formed in the center plate. The hydraulic motor has a cylindrical motor shaft, which is coaxially and relatively rotatably penetrated by one of the axles and drivingly connected to the axles. The axle housing part, compactly containing the hydraulic motor with the motor shaft around the axle, is joined to the center plate so as to facilitate assembly of the IHT.

However, the IHT has the two joint surfaces, each of which is disposed between the center plate and each of the axle housing parts, to be oil-sealed. Further, a hydraulic pump is disposed in a pump housing separated from the left and right axle housing parts and the center plate. To fluidly connect the hydraulic pump to the hydraulic motor via the fluid ducts in the center plate, additional oil passages must be interposed between the center plate and the hydraulic pump, thereby preventing facility of the IHT in minimization, assembly and oil-sealing.

Additionally, a general IHT has a variable displacement hydraulic pump having a movable swash plate interlocking with a control arm pivoted by an IHT housing, so that rotation of the control arm tilts the swash plate for steplessly changing the displacement of the hydraulic pump, thereby changing the rotational direction and speed of an axle of the IHT. The control arm is biased toward its neutral position by a spring or the like, and interlockingly connected to a speed changing operation device such as a pedal or a lever.

In this regard, the IHT may have a system for controlling shock or jerk of a vehicle when the speed changing operation device is suddenly operated to start, stop or accelerate a vehicle having the IHT. For example, U.S. Pat. Nos. 5,836,159 and 6,109,032 discloses an IHT having valves for expanding a neutral zone of an HST of the IHT. The valves are slidably fitted into a center section in an IHT housing and fluidly connected to fluid ducts, which are formed in the center section for mutually fluidly connecting hydraulic pump and motor. A control arm interlockingly connected to a movable swash plate of the hydraulic pump has a surface, which is disposed along the center section so as to be pressed against the valves projecting from the center section. The surface of the control arm abutting against the valves is formed with grooves (or a groove) fluidly communicating with an oil sump in the IHT housing. When one or both of the contacting valves come to be open to the groove or grooves, oil flows out from the fluid duct or ducts in the center section to the oil sump. The groove is (or the grooves are) formed so that the open range of the groove (or grooves) to the valve (or valves) is disposed around a position of the control arm corresponding to the neutral position of the swash plate, thereby expanding the neutral zone of the HST, and moderating the motion of a vehicle having the IHT, even if the speed changing operation device is quickly operated for starting or stopping of the vehicle.

However, the IHT requires a member for adjusting a neutral position of the control arm to match with the neutral position of the swash plate. The member is an eccentric pin separated from the control arm, which requires an operator's labor of screwing a nut or a bolt. Further, a rotary axial shaft of the control arm is disposed in parallel to the sliding direction of the valves, so as to require a considerably large space for rotation of the control arm, thereby preventing minimization of the IHT.

SUMMARY OF THE INVENTION

A first object of the invention is to provide a compact hydraulic transaxle (IHT), which can be fluidly hermetic by a simple structure.

To achieve the first object, in a first aspect of the present invention, a hydraulic transaxle comprises: a housing having a fluid sump therein, the housing including mutually joined housing parts; an axle disposed in the housing; a center section disposed in the housing, the center section being formed therein with a pair of fluid ducts; a hydraulic pump disposed in the housing, fitted to the center section, and communicating with the fluid ducts; and a hydraulic motor disposed in the housing, fitted to the center section, and communicating with the fluid ducts so as to be fluidly connected to the hydraulic pump. The hydraulic motor includes a cylindrical motor shaft relatively rotatably and coaxially penetrated by the axle and drivingly connected to the axle. The coaxial arrangement of the motor shaft and the axle minimizes the housing, thereby minimizing the hydraulic transaxle.

Preferably, the hydraulic transaxle further comprises: another axle disposed in the housing; a differential unit disposed in the housing so as to differentially connect the axles to each other; and a brake disposed in the housing between the center section and the differential unit so as to brake the axles. A dead space between the center section and the differential unit can be used for disposing the brake in the housing, thereby preventing expansion of the housing.

A second object of the present invention is to provide a hydraulic drive system including two compact hydraulic transaxles having respective hydraulic motors for driving respective axles.

To achieve the second object, in a second aspect of the present invention, a hydraulic drive system comprises first and second hydraulic transaxles. The first transaxle includes a first housing, a first axle, a first center section, a hydraulic pump and a first hydraulic motor. The first housing has a fluid sump therein. The first housing includes mutually joined housing parts. The first axle is disposed in the first housing. The first center section is disposed in the first housing. The first center section is formed therein with a pair of fluid ducts. The hydraulic pump is disposed in the first housing, fitted to the first center section, and communicates with the fluid ducts in the first center section. The first hydraulic motor is disposed in the first housing, fitted to the first center section, and communicates with the fluid ducts in the first center section so as to be fluidly connected to the hydraulic pump. The first hydraulic motor includes a first cylindrical motor shaft relatively rotatably and coaxially penetrated by the first axle and drivingly connected to the first axle. The second hydraulic transaxle includes a second housing, a second axle, a second center section and a second hydraulic motor. The second housing has a fluid sump therein. The second housing includes mutually joined housing parts. The second axle is disposed in the second housing. The second center section is disposed in the second housing. The second center section is formed therein with a pair of fluid ducts. The second hydraulic motor is disposed in the second housing, fitted to the second center section, and communicating with the fluid ducts in the second center section so as to be fluidly connected to the hydraulic pump. The hydraulic motor includes a second cylindrical motor shaft relatively rotatably and coaxially penetrated by the second axle and drivingly connected to the second axle.

A third object of the invention is to provide a compact hydraulic transaxle (IHT) including an HST whose neutral zone is expanded with a compact mechanism.

To achieve the third object, in a third aspect of the present invention, a hydraulic transaxle comprises a center section, a variable displacement hydraulic pump, a hydraulic motor, a pump control device for controlling a displacement of the hydraulic pump, a detent device, and a leak valve. The center section is formed therein with a pair of fluid ducts. The hydraulic pump is fitted to the center section so as to communicate with the fluid ducts in the center section. The hydraulic motor is fitted to the center section so as to communicate with the fluid ducts to be fluidly connected to the hydraulic pump. When the hydraulic pump delivers hydraulic fluid to the hydraulic motor, one of the fluid ducts is higher-pressurized, and the other fluid duct is lower-pressurized. The pump control device is shiftable between a neutral position for stopping fluid-delivery of the hydraulic pump to a maximum displacement position for making the hydraulic pump deliver the maximum amount of hydraulic fluid to the hydraulic motor. A shift range of the pump control device between the neutral position and the maximum displacement position is divided into a leak range and a leak-prevention range. The leak range is extended from the neutral position to a limit position toward the maximum displacement position, and the leak-prevention range is extended between the limit position and the maximum displacement range. The detent device is provided for temporarily holding the pump control device at the neutral position. The leak valve is interlockingly connected to the detent device. The leak valve is disposed at an opened-valve position for leaking out a part of hydraulic fluid in the higher-pressurized fluid duct when the pump control device is disposed in the leak range. The leak valve is disposed at a closed-valve position for preventing hydraulic fluid in the higher-pressurized fluid duct from leaking when the pump control device is disposed in the leak-prevention range.

Due to the detent device, the neutral position of the pump control device is constantly accurately matched with a state of the hydraulic pump delivering no fluid, and the conventional eccentric pin for deciding the neutral position of the pump control device becomes unnecessary, thereby preventing complicated labor of screwing a nut or bolt, reducing parts in number and cost, and minimizing the hydraulic transaxle. Further, due to the leak valve, a neutral zone of the hydraulic pump for preventing fluid-delivery to the hydraulic motor can be expanded so as to moderate start and stop of a vehicle having the hydraulic transaxle.

In the third aspect, preferably, the detent device comprises a tip of the leak valve and the pump control device shaped to fit each other. The leak valve is slidably fitted into the center section, and extended at the tip thereof outward from the center section toward the pump control device. Therefore, the pump control device is used for constructing the detent device so as to reduce parts in number and cost, and to minimize the hydraulic transaxle.

In the third aspect, preferably, the hydraulic transaxle further comprises a lost motion mechanism interposed between the leak valve and the pump control device. When the pump control device is shifted into the leak-prevention range from the leak range, the lost motion mechanism acts so as to delay the shift of the leak valve from the opened-valve position to the closed-valve position. Due to the lost motion mechanism, the shift of the leak valve from the opened-valve position to the closed-valve position can be delayed so as to moderate rising of hydraulic delivery pressure of the hydraulic pump, even if the pump control device is quickly operated, thereby preventing sudden acceleration of the vehicle having the hydraulic transaxle.

Further preferably, the lost motion mechanism includes first and second springs. The first spring abuts at one end thereof against one end portion of the leak valve, and is fixed at the other end thereof to a certain position. The second spring abuts against one end thereof against another end portion of the leak valve, and engages at the other end thereof to the pump control device. Due to the first and second springs, the lost motion mechanism can be simply constructed.

In the third aspect, preferably, the leak valve includes a cylinder, biasing means for biasing the cylinder, and a piston disposed in the cylinder. The cylinder has an outer peripheral surface formed therein with a groove. The cylinder is slidably fitted in the center section so as to be shiftable between the opened-valve position and the closed-valve position. When the cylinder is disposed at the opened-valve position, the groove is interposed between the higher-pressurized fluid duct and the lower-pressurized fluid duct so as to partly lead hydraulic fluid from the higher-pressurized fluid duct to the lower-pressurized fluid duct. The biasing means biases the cylinder toward the closed-valve position. The piston is interlockingly connected to the pump control device, and disposed in the cylinder so as to have fluid between the piston and the cylinder. When the pump control device is shifted in the leak-prevention range by an operation force exceeding a biasing force of the biasing means applied onto the cylinder, the piston and the cylinder integrally move with a constant amount of the fluid therebetween so as to set the cylinder at the opened-valve position, and then the cylinder returns to the closed-valve position by the biasing force of the biasing means. When the pump control device is shifted in the leak-prevention range by an operation force less than the biasing force of the biasing means, the piston slides in the cylinder relative to the cylinder so as to set the cylinder at the closed-valve position.

Due to the cylinder disposed in the center section, the leak valve can be covered with the center section so as to prevent an additional space for the leak valve in the housing, thereby preventing expanding of the hydraulic transaxle.

In the third aspect, preferably the hydraulic transaxle further comprises a fluid sump in which the center section is submerged. The leak valve disposed at the opened-valve position leads the part of the hydraulic fluid from the higher-pressurized fluid duct to the fluid sump. Therefore, the leak valve can simply drain fluid from the higher-pressurized fluid duct.

Alternatively, preferably, the leak valve disposed at the opened-valve position leads the part of the hydraulic fluid from the higher-pressurized fluid duct to the lower-pressurized fluid duct. Therefore, noise caused by draining fluid to the fluid sump in the housing can be prevented, thereby providing a silent hydraulic transaxle.

Further preferably, the leak valve includes auxiliary valve means. When the leak valve is disposed at the closed-valve position, and when hydraulic pressure of fluid in either the higher-pressurized or lower-pressurized fluid duct is suddenly increased, the auxiliary valve means can be opened to pass increased fluid from the fluid duct whose hydraulic pressure is suddenly increased to the other fluid duct. Accordingly, while the leak valve is closed, the auxiliary valve means can be opened to reduce the sudden increase of hydraulic pressure in the HST circuit caused by operation for acceleration or deceleration or by stopping the pump control device at a target position, thereby preventing a vehicle from being shocked.

Further preferably, the leak valve includes a first leak valve and a second leak valve provided with the respective auxiliary valve means. Both of the first and second leak valves are disposed at respective opened-valve positions for leaking out a part of hydraulic fluid in the higher-pressurized fluid duct when the pump control device is disposed in the leak range. The first and second leak valves are disposed at the respective closed-valve positions for preventing hydraulic fluid in the higher-pressurized fluid duct from leaking when the pump control device is disposed in the leak-prevention range.

Further preferably, the auxiliary valve means of one of the first and second leak valves can be opened during forward traveling of a vehicle, and the auxiliary valve means of the other second or first leak valve can be opened during backward traveling of the vehicle. Therefore, the above shock reduction effect by the auxiliary valve means can be obtained in each of forward and backward traveling cases.

Further preferably, a lost motion mechanism is interposed between at least one of the first and second leak valves and the pump control device, wherein, when the pump control device is shifted into the leak-prevention range from the leak range, the lost motion mechanism acts so as to delay the shift of the leak valve from the opened-valve position to the closed-valve position. Due to the lost motion mechanism, the shift of at least one of the first and second leak valves from the opened-valve position to the closed-valve position can be delayed so as to moderate rising of delivery displacement of the hydraulic pump, even if the pump control device is quickly operated, thereby preventing sudden acceleration of the vehicle having the hydraulic transaxle.

These, further and other objects, features and advantages will appear more fully from the following description with reference to the accompanying drawings.

DETAILED DESCRIPTION OF THE INVENTION

Figure 1:
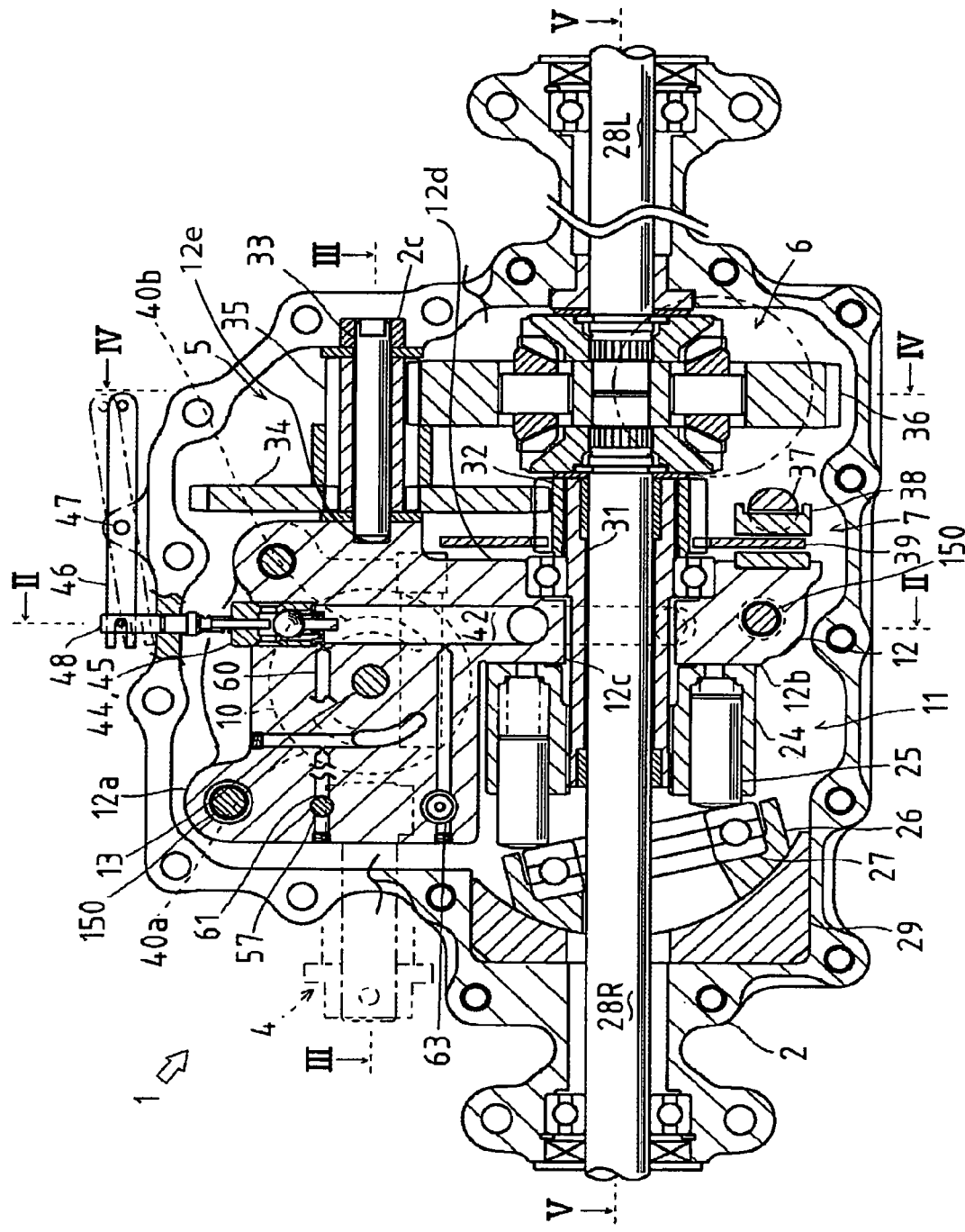
FIG. 1 is a plan view partly in section of an IHT.

A general configuration of an IHT 1 shown in FIGS. 1 to 5 will be described. IHT 1 has a transaxle housing 2 to be mounted on a vehicle frame (not shown). The transaxle housing 2 is constituted by an upper housing half and a lower housing half separably joined to each other through a horizontal joint surface. Alternatively, transaxle housing 2 may be dividable into left and right halves along a vertical surface (perpendicular to axles). A hydraulic pump 10, a hydraulic motor 11 and a center section 12 are assembled together so as to constitute an HST disposed in transaxle housing 2. Transaxle housing 2 also incorporates a pump control device 4 for controlling a displacement of hydraulic pump 10, a motor control device 8 for controlling a displacement of hydraulic motor 11, a pair of left and right horizontal axles 28L and 28R, a differential gear unit 6 differentially connecting axles 28L and 28R to each other, a deceleration gear train 5 drivingly interposed between hydraulic motor 11 and differential gear unit 6, and a brake 7 for braking the deceleration gear train 5. Transaxle housing 2 is filled therein with fluid, so as to serve as a fluid sump for supplying hydraulic fluid to the HST and lubricating fluid to gears and the like.

Transaxle housing 2 has a main portion, and left and right axle support portions laterally extended from opposite sides of the main portion for journaling respective axles 28L and 28R. In the main portion of transaxle housing 2, differential gear unit 6 is laterally eccentrically disposed along one of the left and right sides (in this embodiment, the left portion) of the main portion, so that right axle 28R is longer than left axle 28L in the main portion of the transaxle housing 2. A vertical input shaft (pump shaft) 13 of the HST is offset from right axle 28R in the fore-and-aft direction of IHT 1, and projects upward from the top of transaxle housing 2. A pulley 14 and a cooling fan 15 are fixed onto input shaft 13 above transaxle housing 2. A belt (not shown) is looped over pulley 14 so as to transmit power of an engine (not shown) mounted on the vehicle frame to input shaft 13.

Input shaft 13 serves as the pump shaft of hydraulic pump 10. In this regard, a cylinder block 16 of hydraulic pump 10 is not-relatively rotatably fitted on input shaft 13 so that input shaft 13 serves as the rotary axis of cylinder block 16. Pistons 17 are axially (vertically) reciprocally fitted into cylinder block 16 via biasing respective springs around input shaft 13, so as to make hydraulic pump 10 into an axial piston type.

Hydraulic pump 10 includes a movable swash plate 18, fixedly provided at a bottom portion thereof with a thrust bearing 19, pressed against ball-like heads of pistons 17. Swash plate 18 is slidably fitted to an arcuately recessed surface formed on a ceiling of upper housing half 2a. Swash plate 18 is open at the center portion thereof so as to freely pass input shaft 13 therethrough.

Transaxle housing 2, especially, upper housing half 2a supports a pump control device 4 for controlling the delivery rate and direction of hydraulic pump 10, thereby controlling the rotary speed and direction of axles 28L and 28R. Pump control device 4 will be described later.

Center section 12 is substantially L-like shaped in plan view, such as to have a horizontal portion 12a and a vertical portion 12b. In the main portion of transaxle housing 2, center section 12 is disposed laterally opposite to differential gear unit 6. Cylinder block 16 is slidably rotatably fitted onto a top surface of horizontal portion 12a of center section 12. Input shaft 13 rotatably penetrates horizontal portion 12a of center section 12. A charge pump 23 is fitted onto a bottom surface of center section 12, and input shaft 13 passed through center section 12 is fitted into charge pump 23 so as to serve as a drive shaft of charge pump 23. Center section 12 is fastened to upper housing half 2a via upwardly screwed vertical bolts 150 (see FIGS. 1 and 2) so as to space its bottom surface with charge pump 23 from a bottom wall of transaxle housing 2 (lower housing half 2b). An oil filter 30 is disposed between the bottom surfaces of center section 12 and an inner (top) surface of the bottom wall of transaxle housing 2, so as to enclose charge pump 23.

Axle 28R rotatably penetrates vertical portion 12b of center section 12. A cylinder block 24 of hydraulic motor 11 is slidably rotatably fitted onto a vertical surface of vertical portion 12b of center section 12, laterally opposite to differential gear unit 6. Cylinder block 24 is penetrated by a center axial hole, through which axle 28R is freely passed outward from center section 12. A cylindrical motor shaft 31 is disposed into the center axial hole of cylinder block 24 concentrically with axle 28R, and not-relatively rotatably fitted to the inner periphery surface of cylinder block 24 (via splines), so as to be rotatable relative to axle 28R. Pistons 25 are reciprocally fitted into cylinder block 24 via respective biasing springs around motor shaft 31, thereby making hydraulic motor 11 into an axial piston type. Hydraulic motor 11 includes a movable swash plate 26, fixedly provided with a thrust bearing 27 pressed against ball-like heads of pistons 25. Swash plate 26 is convexed, such as to be slidably fitted into an arcuate recess of a guide support 29, which is clamped between upper housing half 2a and lower housing half 2b. Swash plate 26 is opened at its center portion so as to freely rotatably pass axle 28R therethrough.

Figure 5:
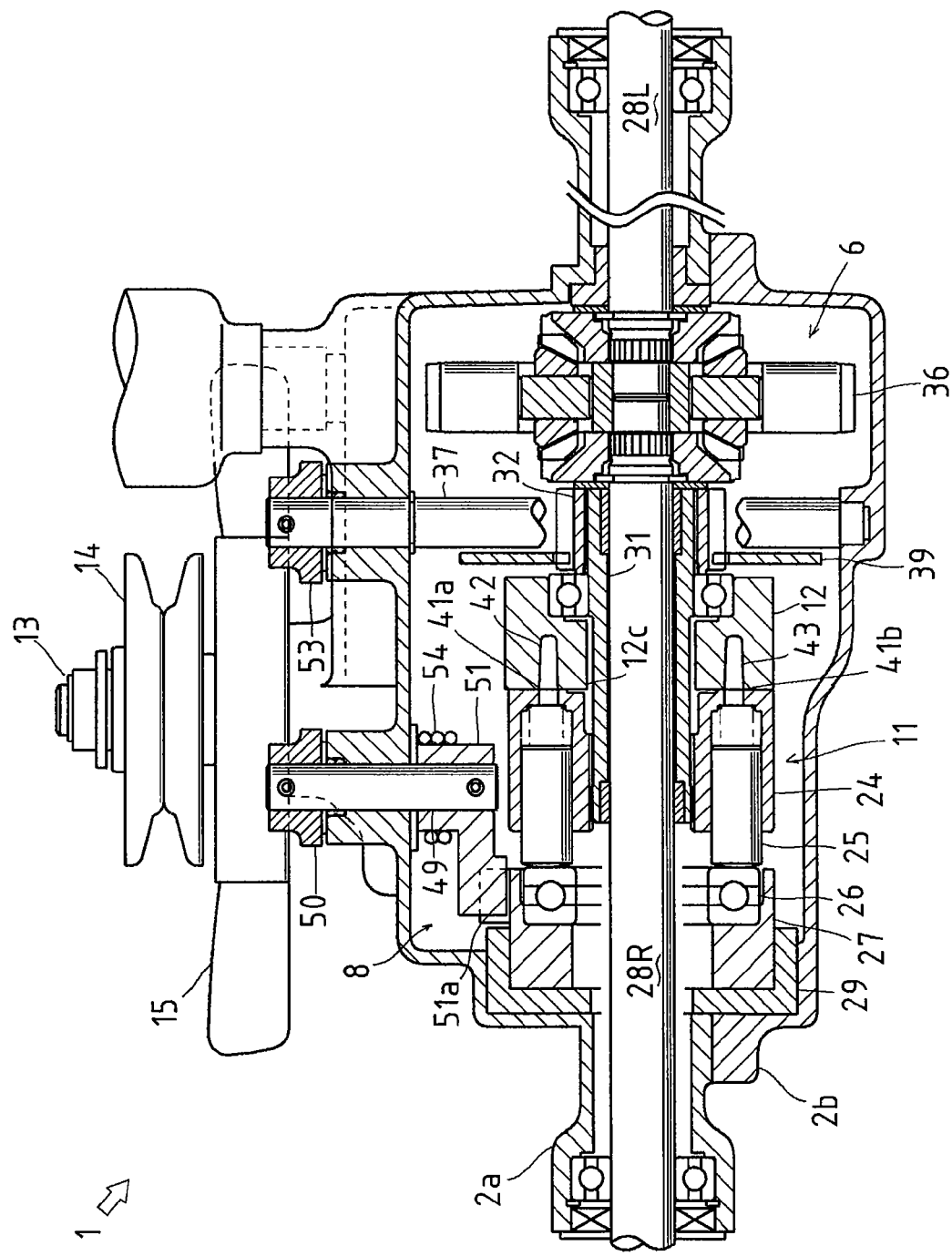
FIG. 5 is a cross sectional view taken along V-V line of FIG. 1.

Transaxle housing 2 also supports motor control device 8 for controlling a displacement of hydraulic motor 11. In this regard, as shown in FIG. 5, a vertical motor control shaft 49 is relatively rotatably supported by the top wall of upper housing half 2a. Motor control shaft 49 is fixedly provided on a top portion thereof with an outer motor control arm 50 above upper housing half 2a, and on a bottom portion thereof with an inner motor control arm 51 in the main portion of transaxle housing 2. An engaged portion 51a is extended downward from a tip of inner motor control arm 51 and fitted into a groove formed in a side portion of swash plate 26. In this way, movable swash plate 26 is made into a cradle type. Therefore, by rotating outer motor control arm 50, motor control shaft 49 and inner control arm 51 integrally rotate so as to tilt swash plate 26, thereby changing the displacement of hydraulic motor 11.

Alternatively, hydraulic motor 11 may be provided with a trunnion type movable swash plate, which needs not to be slidably guided by a member such as guide support 29. Further alternatively, hydraulic motor 11 may be fixed in displacement, such as to have a fixed swash plate, if a speed variation required for a vehicle having IHT 1 can be ensured by only the displacement control of hydraulic pump 10. Further alternatively, hydraulic motor 11 (and hydraulic pump 10) may be made of a radial piston type.

Center section 12 is penetrated by a hole 12c from the vertical surface of vertical portion 12b fitted to cylinder block 24 of hydraulic motor 11, thereby freely passing axle 28R therethrough. Cylindrical motor shaft 31 is extended along axle 28R from cylinder block 24 into hole 12c relatively rotatably to center section 12, and further extended outward through an opening formed in a surface 12d of center section 12 (vertical portion 12b) opposite to hydraulic motor 11 and toward differential gear unit 6. Such cylindrical motor shaft 31 is relatively rotatably fitted at opposite ends thereof onto axle 28R via bushes (radial bearings), and rotatably supported by center section 12 via a bearing. The coaxial (concentric) arrangement of cylindrical motor shaft 31 around axle 28R minimizes the inner space of transaxle housing 2, i.e., IHT 1.

On the side of vertical portion 12b of center section 12 opposite to hydraulic motor 11, deceleration gear train 5 is interposed between motor shaft 31 and differential gear unit 6 around axle 28R and motor shaft 31. In this regard, a motor output gear 32 is not-relatively rotatably fitted (via splines) on the end portion of motor shaft 31 projecting outward from center section 12 opposite to hydraulic motor 11. A counter shaft 33 is disposed in parallel to motor shaft 31 and axles 28L and 28R. Counter shaft 33 is rotatably supported at one end thereof by a support portion 12e formed by a side portion of horizontal portion 12a of center section 12, and at the other end thereof by a bearing piece 2c clamped between side walls of upper and lower housing halves 2a and 2b. An axially long and diametrically small gear 35 is relatively rotatably provided on counter shaft 33. A diametrically large gear 34 is not-relatively rotatably fitted onto diametrically small gear 35, and meshes with motor output gear 32. Diametrically small gear 35 meshes with a bull gear 36 of differential gear unit 6.

Such deceleration gear train 5 transmits the output force of hydraulic motor 11, i.e., the rotary force of motor shaft 31, to differential gear unit 6 mutually differentially connecting axles 28L and 28R. Axles 28L and 28R are journalled in the respective left and right axle support portions of transaxle housing 2, and project laterally outward from transaxle housing 2 so as to be fixedly provided thereon with respective drive wheels 9 (see FIG. 27).

In the main portion of transaxle housing 2, wet disk type brake 7 covers a dead space between center section 12 (vertical portion 12b) and differential gear unit 6 adjacent to motor shaft 31 projecting from center section 12. Brake 7 has a brake disk 39 slidably fitted on motor output gear 32. A vertical camshaft 37 is rotatably supported by transaxle housing 2 and disposed adjacent to brake disk 39 opposite to a vertical surface of vertical portion 12b of center section 12. Camshaft 37 is partly cut away at a portion facing brake disk 39 so as to form a sectionally semicircular cam portion. A pressure plate 38 is passed through the cut-away recess of camshaft 37 facing brake disk 39. A brake pad is fitted onto the vertical surface of vertical portion 12b of center section 12 opposite to pressure plate 38.

Camshaft 37 projects upward from transaxle housing 2 so as to be fixedly provided thereon with a brake arm 53 (see FIG. 5). Brake arm 53 is interlockingly connected to a brake manipulator, such as a pedal or a lever. By braking manipulation of rotating brake arm 53, camshaft 37 is rotated so that the cam portion of camshaft 37 pushes pressure plate 38 toward brake disk 39, whereby brake disk 39 is pressed between pressure plate 38 and the brake pad on center section 12 so as to brake motor output gear 32 and motor shaft 31, thereby braking axles 28L and 28R.

Figure 2:
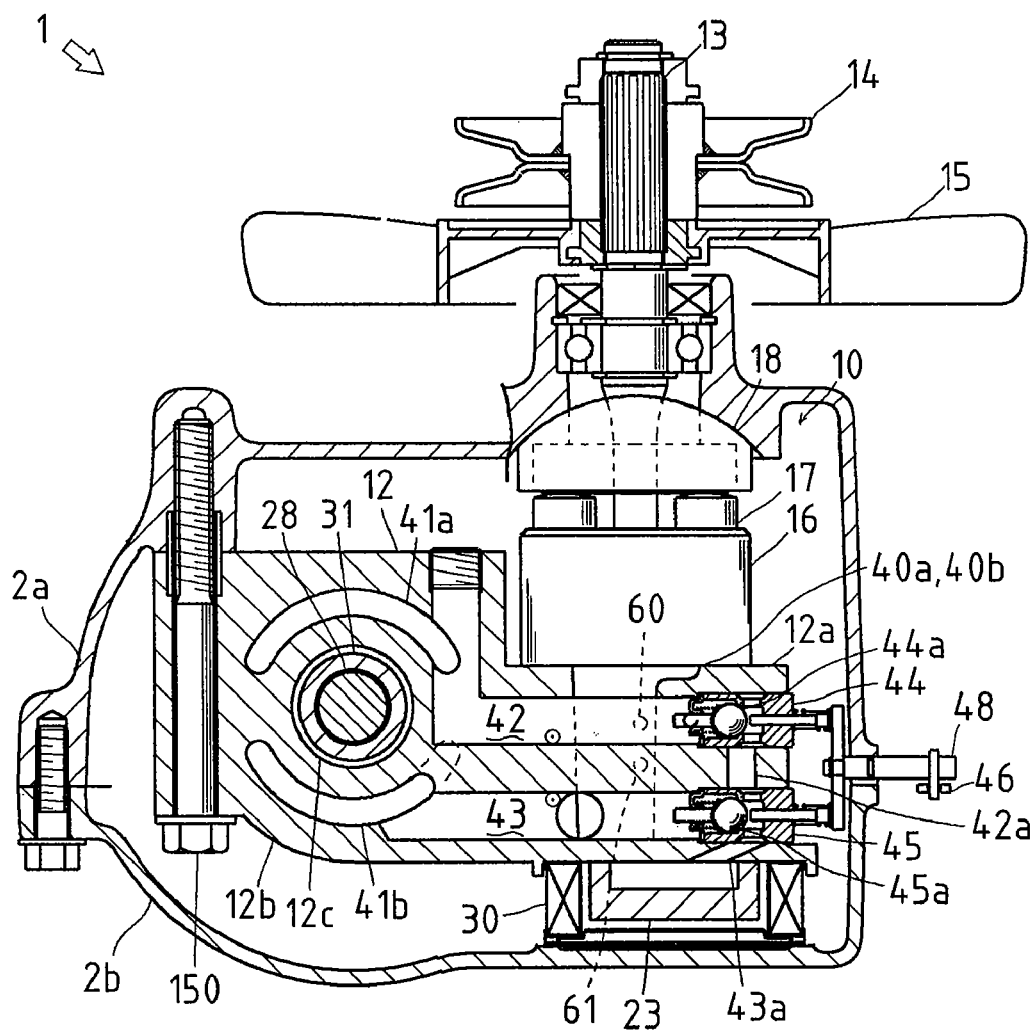
FIG. 2 is a cross sectional view taken along II-II line of FIG. 1.

A hydraulic circuit of the HST, especially, hydraulic fluid ducts formed in center section 12, will be described. As shown in FIGS. 1 and 2, a pair of kidney ports 40a and 40b are open at the horizontal top surface of horizontal portion 12a of center section 12, onto which cylinder block 16 of hydraulic pump 10 is fitted, so as to supply or discharge fluid to and from cylinder block 16. As shown in FIG. 2, a pair of kidney ports 41a and 41b are open at the vertical side surface of vertical portion 12b of center section 12, onto which cylinder block 24 of hydraulic motor 11 is fitted, so as to supply or discharge fluid to and from cylinder block 24.

Center section 12 is formed therein with an upper fluid duct 42 interposed between kidney ports 40a and 41a, and with a lower fluid duct 43 interposed between kidney ports 40b and 41b. Fluid ducts 42 and 43 have horizontal linear portions, which are vertically aligned in parallel and formed within horizontal portion 12a of center section 12. The vertical thickness of horizontal portion 12a ensures the vertical alignment of the parallel horizontal portions of fluid ducts 42 and 43.

Upper and lower fluid ducts 42 and 43 are open outward on a side of horizontal portion 12a of center section 12, and plugged by respective check valves 44 and 45. Horizontal portion 12a of center section 12 is formed therein with a charge fluid duct 43a branched downward from lower fluid duct 43 at a suction port of check valve 45 therein, and open to a delivery port of charge pump 23 fitted onto the bottom surface of horizontal portion 12a of center section 12. Horizontal portion 12a of center section 12 is formed therein with a vertical charge fluid duct 42a between upper and lower fluid ducts 42 and 43 so as to connect a suction port of check valve 44 to the suction port of check valve 45. A suction port of charge pump 23 is open toward the inner peripheral surface of oil filter 30.

During actuation of the HST, i.e., unless swash plate 18 of hydraulic pump 10 is disposed at the neutral position, one of fluid ducts 42 and 43 is higher-pressurized, and the other is lower-pressurized. Check valves 44 and 45 include respective valve balls 44a and 45a, each of which is shiftable between an opened-valve position to communicate the suction port of corresponding check valve 44 or 45 to corresponding fluid duct 42 or 43 and a closed-valve position to shut off the suction port of corresponding check valve 44 or 45 from corresponding fluid duct 42 or 43. One of check valves 44 and 45, which is disposed in the higher-pressurized fluid duct 42 or 43, is closed, that is, corresponding valve ball 44a or 45a is disposed at the closed-valve position, because the hydraulic pressure in higher-pressurized fluid duct 42 or 43 becomes higher than that in charge fluid ducts 42a and 43a. Therefore, higher-pressurized fluid duct 42 or 43 is shut off from charge pump 23. The other check valve 45 or 44, which is disposed in the lower-pressurized fluid duct 43 or 42, can be opened, that is, corresponding valve ball 45a or 44a can be disposed at the opened-valve position, because the hydraulic pressure in charge fluid ducts 42a and 43a becomes higher than that in lower-pressurized fluid duct 43 or 42. Therefore, lower-pressurized fluid duct 43 or 42 is supplied with fluid delivered from charge pump 23 and filtered by oil filter 30.

As shown in FIGS. 1 and 2, check valves 44 and 45 are interlockingly connected to a bypass operation lever 46 disposed along an outer sidewall of transaxle housing 2. Bypass operation lever 46 is horizontally rotatably pivoted at an intermediate portion thereof by a vertical pivot shaft 47 supported by a portion extended outward from the side surface of transaxle housing 2, as best shown in FIG. 1. Bypass operation lever 46 is pivotally connected at one end thereof to a horizontal pushpin 48. The pushpin 48 is disposed substantially perpendicular to bypass operation lever 46, and axially slidably penetrates the sidewall of transaxle housing 2. In transaxle housing 2, pushpin 48 is bifurcated into parallel rods inserted into charge valves 44 and 45 toward respective valve balls 44a and 45a. The bifurcating rods of pushpin 48 are biased away from valve balls 44a and 45a, so as to allow the movement of valve balls 44a and 45a due to the hydraulic pressure in fluid ducts 42 and 43 and charge fluid ducts 42a and 43a. Bypass operation lever 46 is interlockingly connected at the other end thereof to a bypass manipulator, such as a lever, manipulated by an operator.

When a vehicle having IHT 1 is towed, the bypass manipulator is manipulated to rotate bypass operation lever 46, so as to push pushpin 48 inward into transaxle housing 2 against the biasing force, whereby the bifurcating rods of pushpin 48 push respective valve balls 44a and 45a to the opened-valve positions, so that both check valves 44 and 45 are forcibly opened and pass hydraulic fluid from fluid ducts 42 and 43 to the fluid sump in transaxle housing 2 via charge fluid ducts 42a and 43a. Due to the bypassing with opened charge valves 44 and 45, hydraulic motor 11 can be freely rotated following rotation of wheels 9 (axles 28L and 28R), and hydraulic pump 10 is protected from hydraulic backpressure while hydraulic motor 11 is pumped by rotation of wheels 9 (axles 28L and 28R).

Figure 3:
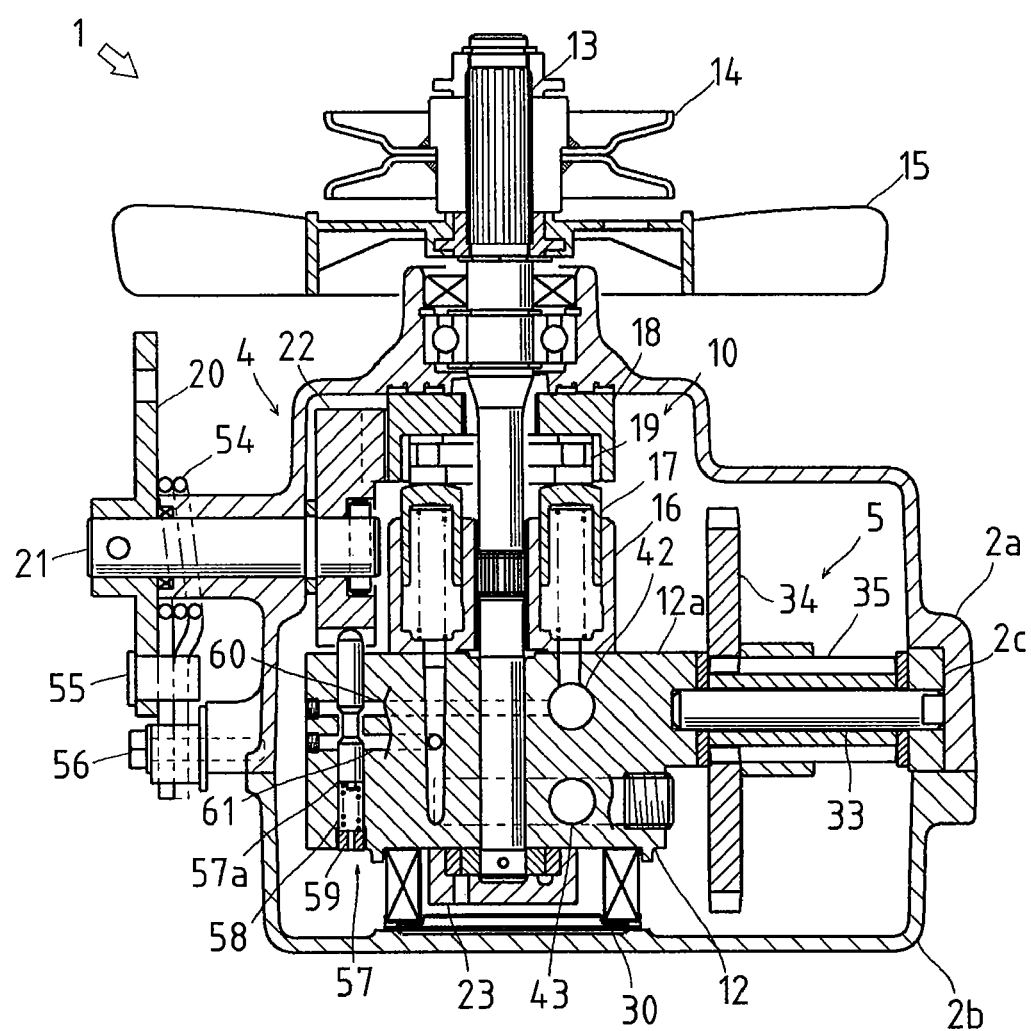
FIG. 3 is a cross sectional view taken along III-III line of FIG. 1.
Figure 4:
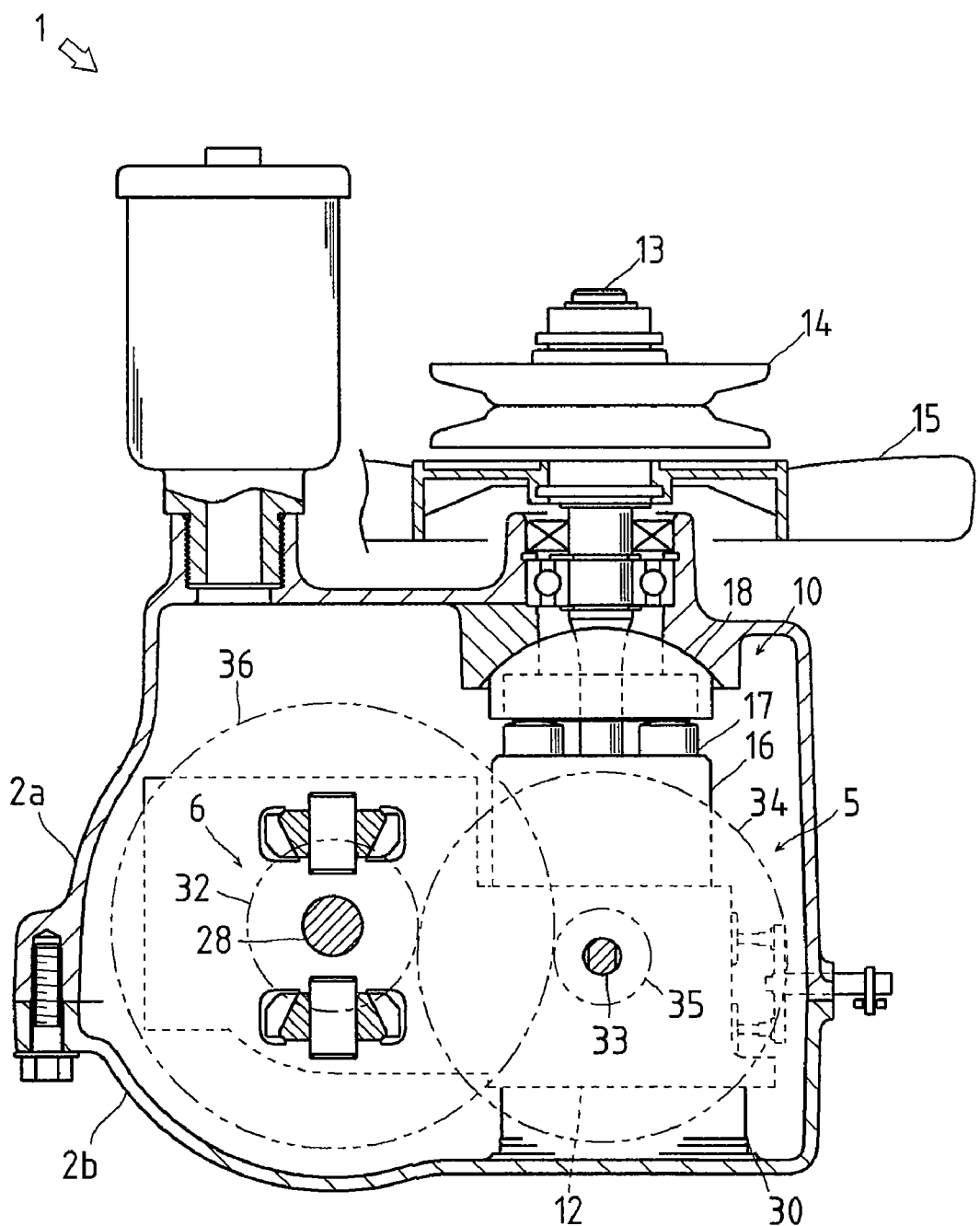
FIG. 4 is a cross sectional view taken along IV-IV line of FIG. 1.
Figure 6:
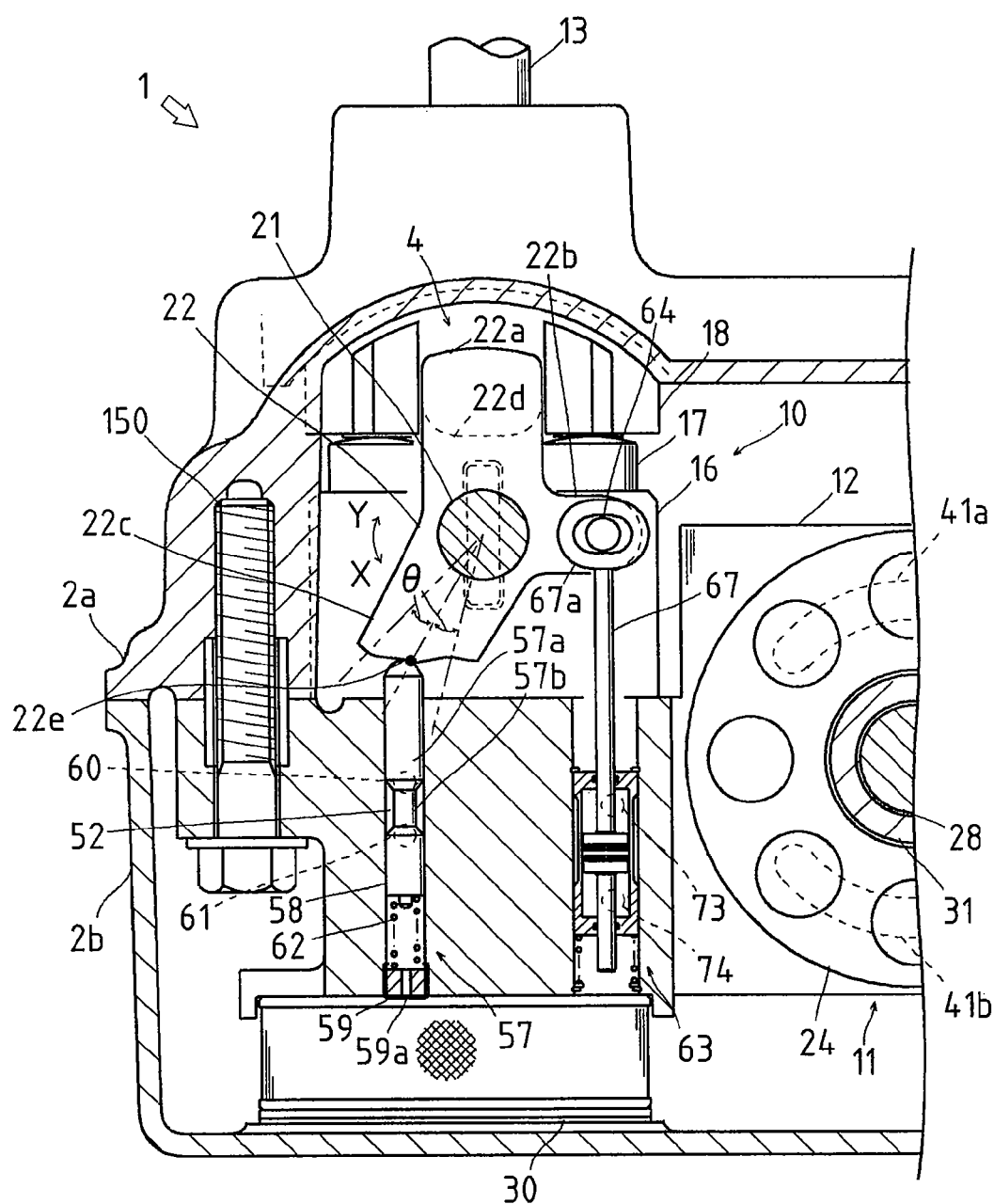
FIG. 6 is a fragmentary sectional side view of the IHT with a leak valve according to a first embodiment.

Pump control device 4 for controlling the displacement of hydraulic pump 10 will be described in detail. As shown in FIGS. 1, 3 and 6, pump control device 4 is assembled with upper housing half 2a. A horizontal pump control shaft 21 is disposed in parallel to axles 28L and 28R, and rotatably supported by upper housing half 2a. An outer pump control arm 20 is fixed onto pump control shaft 21 out of transaxle housing 2. As shown in FIG. 3, outer pump control arm 20 is integrally formed with an arm portion, which is extended in one direction from pump control shaft 21 so as to be connected at a tip thereof to a speed changing manipulator (not shown) such as a lever or a pedal. Preferably, the arm portion of outer pump control arm 21 is rotatable in the fore-and-aft direction of a vehicle so as to be pulled and pushed by a link rod connected to the speed changing manipulator. Pump control arm 20 is also integrally formed with another arm portion, which is extended in another direction from pump control shaft 21 and fixedly provided at a tip thereof with a pushing pin 55 as discussed later.

In transaxle housing 2, an inner pump control arm 22 is fixed onto pump control shaft 21. As shown in FIG. 6, inner pump control arm 22 is integrally formed with a first arm portion 22a, a second arm portion 22b and a third arm portion 22c radially extended from pump control shaft 21. Alternatively, any of first, second and third arm portions 22a, 22b and 22c may be made of a member separated from pump control arm 22, only if it is rotatable integrally with pump control arm 22.

First arm portion 22a is extended vertically from pump control shaft 21. An engaged portion 22d projects from a tip of first arm portion 22a in parallel to pump control shaft 21 so as to be engaged into a groove formed in a side portion of movable swash plate 18, thereby making movable swash plate 18 into a cradle type. Due to the speed changing manipulation of rotating pump control arm 20, swash plate 18 is tilted to change the displacement and delivery direction of hydraulic pump 10, thereby changing the rotary direction and speed of hydraulic motor 11.

As shown in FIG. 3, a boss portion of upper housing half 2a with pump control shaft 21 therein is extended outward from the outer side surface of upper housing half 2a. A neutral returning spring 54 is coiled around the boss portion of upper housing half 2a. Both end portions of spring 54 are twisted to cross each other and extended to clamp pushing pin 55 and a retaining pin 56 therebetween. Pushing pin 55 is fixed on the arm portion of outer pump control arm 20, as mentioned above, and extended in parallel to pump control shaft 21.

Retaining pin 56 is fixed to a sidewall portion of upper housing half 2a, and extended in parallel to pump control shaft 21.

By rotating pump control arms 20 and 22 for tilting swash plate 18 from its neutral position, i.e., for driving hydraulic motor 11, pushing pin 55 pushes one of the end portions of spring 54 while the other end portion of spring 54 is retained by retaining pin 56, thereby generating a biasing force for returning pump control arms 20 and 22 and swash plate 18. In this way, while pump control arms 20 and 22 are rotated for driving hydraulic motor 11, retaining pin 56 defines a neutral position toward which pump control arms 20 and 22 are biased. Due to a later-discussed detent mechanism constructed between inner pump control arm 22 and a leak valve 57 in transaxle housing 2, the neutral position of pump control arms 20 and 22 necessarily accurately agrees with the neutral position of swash plate 18, whereby retaining pin 56 is not required to adjust its position relative to pushing pin 55 for canceling a difference from the proper position corresponding to the neutral position of swash plate 18. More specifically, retaining pin 56 does not have to be processed into a complicated shape, such as an eccentric shaft.

Referring to FIGS. 1, 3, 6 and 8, leak valve 57 for expanding a neutral zone of the HST will be described. Leak valve 57 is opened to leak out a part of fluid from higher-pressurized fluid duct 42 or 43 in center section 12 while swash plate 18 is tilted in a range from the neutral position toward its maximum tilt angle. The tilt range of swash plate 18 corresponding to opening of leak valve 57 is defined as the expanded neutral zone of the HST.

A vertical valve chamber 58 penetrates horizontal portion 12a of center section 12. A vertical valve member 57a of leak valve 57 is axially slidably fitted into valve hole 58, and projects upward from a top open end of valve chamber 58 so that an upwardly pointed head of valve member 57a abuts against a lower edge of third arm portion 22c of pump control arm 22. A bottom open end of valve chamber 58 is plugged by a plug 59 which is penetrated by a vertical passage 59a for opening valve chamber 58 to the fluid sump inside oil filter 30. Plug 59 may be screwed into valve chamber 58. In valve chamber 58, a spring 62 is compressed between valve member 57a and plug 59 so as to bias valve member 57a upward, whereby the head of valve member 57a is constantly pressed against the bottom edge of third arm portion 22c.

Center section 12 is formed therein with a pair of upper and lower parallel horizontal fluid ducts 60 and 61 opening to valve chamber 58. Upper and lower fluid ducts 60 and 61 are connected to respective fluid ducts 42 and 43 via respective orifices. Valve member 57a slidably and fluid-tightly fits the inner peripheral surface of center section 12 in valve chamber 58 so as to close fluid ducts 60 and 61. However, as shown in FIG. 6, valve member 57a is narrowed or cut away at a vertically intermediate portion thereof so as to have an annular groove 57b, which is spaced from the inner peripheral surface of center section 12 in valve chamber 58 so as to ensure a leak passage 52.

When valve member 57a is disposed in a certain vertical slide range in valve chamber 58, both of fluid ducts 60 and 61 are open to leak passage 52. In this state, fluid flows from higher-pressurized fluid duct 60 or 61 to lower-pressurized fluid duct 61 or 60 via leak passage 52, thereby canceling (or reducing) a difference of hydraulic pressure between fluid ducts 42 and 43 and ensuring the neutral state of the HST. The certain vertical slide range of valve member 57a for keeping the HST in neutral is defined as an opened-valve position C of leak valve 57 (valve member 57a).

Figure 8:
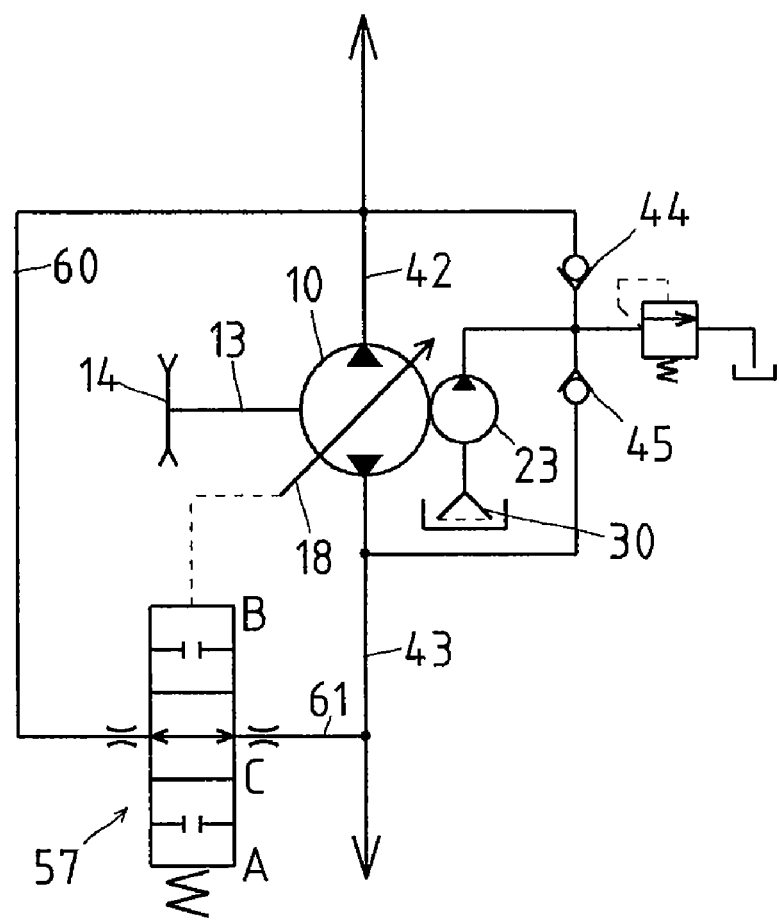
FIG. 8 is a diagram of a hydraulic circuit for the leak valve according to the first embodiment.

In FIG. 8, opened-valve position C of leak valve 57 is the middle position of three positions thereof. Leak valve 57 is shiftable among opened-valve position C and opposite closed-valve positions A and B having opened-valve position C therebetween.

A point 22e on the lower edge of third arm portion 22c to abut against the head of valve member 57a is defined by every tilt position of swash plate 18. Thus, when pushing pin 55 pressed by spring 54 is disposed at the initial position relative to retaining pin 56, point 22e on the lower edge of third arm portion 22c abutting against the head of valve member 57a corresponds to the proper neutral position of swash plate 18. At this time, point 22e agrees with an angled point on the lower edge of third arm portion 22c, against which the upwardly pointed head of valve member 57a abuts so as to serve as detent means for temporarily holding pump control arms 20 and 22 at this neutral position, and holding leak valve 57 at opened-valve position C, so that the neutral state of the HST necessarily exactly corresponds to the neutral position of swash plate 18 and pump control arms 22 and 20. This is the reason why retaining pin 56 is not required to adjust its position relative to pushing pin 55 for canceling a difference from the proper position corresponding to the neutral position of swash plate 18.

Further, the vertical shift range of valve member 57a corresponding to its opened-valve position C has a considerable length so as to expand the neutral zone of the HST, thereby easing the precision in dimension setting of pump control arm 22, especially of the lower edge of third arm portion 22c, relative to valve member 57a. However, hereinafter, description will be given on the assumption that the lower edge of third arm portion 22c is set in dimension optimally so that an exact opened-valve position of valve member 57a corresponds to the neutral position of swash plate 18.

The lower edge of third arm portion 22c is cut wavelike so as to have different radii (i.e., the distance of any point 22e on the lower edge of third arm portion 22c from the center axis of pump control shaft 21), so that, during rotation of swash plate 18 and inner pump control arm 22, the vertical shift position of valve member 57a in valve chamber 58 varies. In other words, various radii of third arm portion 22c define various vertical shift positions of valve member 57a in valve chamber 58. The radius of the lower edge of third arm portion 22c (i.e., the distance of point 22e on the lower edge of third arm portion 22c from the center axis of pump control shaft 21), when swash plate 18 is disposed at the neutral position, is determined so as to set leak valve 57 at opened-valve position C.

While pump control arms 20 and 22 are rotated from their neutral position to a maximum angle θ in a direction X (see FIG. 6), swash plate 18 is moved to higher-pressurize fluid ducts 42 and 60. Also, due to the wavelike shape of the lower edge of third arm portion 22c, during the rotation of pump control arms 20 and 22 from the neutral position to maximum angle θ in direction X, the distance of point 22e on the lower edge of third arm portion 22c abutting against valve member 57a from the center axis of pump control shaft 21 (i.e., the radius of third arm portion 22c with respect to point 22e) is gradually increased, that is, point 22e on the lower edge of third arm portion 22c abutting against valve member 57a is gradually lowered so as to push down valve member 57a into center section 12. When pump control arms 20 and 22 reaches maximum rotation angle θ, the radius of third arm portion 22c with respect to point 22e becomes the maximum, so that valve member 57a reaches its lowest shift position.

However, during a certain early rotation range of pump control arms 20 and 22 from their neutral position in direction X, i.e., when the vehicle starts to travel forward, valve member 57a is moved within the above-mentioned certain vertical shift range thereof corresponding to opened-valve position C of leak valve 57, whereby a part of the fluid in higher-pressurized fluid ducts 42 and 60 leaks to lower-pressurized fluid ducts 61 and 43 via leak passage 52 so as to reduce the pressure-rise in higher-pressurized fluid ducts 42 and 60, thereby moderating the start of the vehicle.

While pump control arms 20 and 22 are further rotated in direction X to maximum angle θ beyond the above early rotation range, valve member 57a is further lowered so that its outer peripheral surface closes the opening of fluid duct 60 above fluid duct 61. This lower shift range of valve member 57a for shutting off fluid ducts 60 and 42 from leak passage 52 defines above-mentioned lower closed-valve position A of leak valve 57 (shown in FIG. 8). While leak valve 57 is disposed at closed-valve position A, higher-pressurized fluid ducts 42 and 60 are separated from lower-pressurized fluid ducts 43 and 61 so as to ensure the proper amount of hydraulic fluid determined by the position of swash plate 18 to circulate between hydraulic pump 10 and motor 11. Therefore, hydraulic motor 11 is efficiently driven for forwardly driving axles 28L and 28R without leak of fluid from higher-pressurized fluid duct 42.

On the other hand, while pump control arms 20 and 22 are rotated from their neutral position to a maximum angle θ in an opposite direction Y (see FIG. 6), swash plate 18 is moved to higher-pressurize fluid ducts 43 and 61. Also, due to the wavelike shape of the lower edge of third arm portion 22c, during the rotation of pump control arms 20 and 22 from the neutral position to maximum angle in direction Y, the distance of point 22e on the lower edge of third arm portion 22c abutting against valve member 57a from the center axis of pump control shaft 21 (i.e., the radius of third arm portion 22c with respect to point 22e) is gradually decreased, whereby point 22e on the lower edge of third arm portion 22c abutting against valve member 57a gradually arises from center section 12 because of the upward biasing force of spring 62. When pump control arms 20 and 22 reaches maximum rotation angle θ, the radius of third arm portion 22c with respect to point 22e becomes the minimum, so that valve member 57a reaches its highest shift position.

However, during a certain early rotation range of pump control arms 20 and 22 from their neutral position in direction Y, i.e., when the vehicle starts to travel backward, valve member 57a is moved within the above-mentioned certain vertical shift range thereof corresponding to opened-valve position C of leak valve 57, whereby a part of the fluid in higher-pressurized fluid ducts 43 and 61 leaks to lower-pressurized fluid ducts 60 and 42 via leak passage 52 so as to reduce the pressure-rise in higher-pressurized fluid ducts 43 and 61, thereby moderating the start of the vehicle.

While pump control arms 20 and 22 are further rotated in direction Y to maximum angle θ beyond the above early rotation range, valve member 57a is further raised so that its outer peripheral surface closes the opening of fluid duct 61 below fluid duct 60. This upper shift range of valve member 57a for shutting off fluid ducts 61 and 43 from leak passage 52 defines above-mentioned upper closed-valve position B of leak valve 57 (shown in FIG. 8). While leak valve 57 is disposed at closed-valve position B, higher-pressurized fluid ducts 43 and 61 are separated from lower-pressurized fluid ducts 42 and 60 so as to ensure the proper amount of hydraulic fluid determined by the position of swash plate 18 to circulate between hydraulic pump 10 and motor 11. Therefore, hydraulic motor 11 is efficiently driven for backwardly driving axles 28L and 28R without leak of fluid from higher-pressurized fluid duct 43.

As a result, during early acceleration of a vehicle starting to travel forward or backward, leak valve 57 is opened so as to open leak passage 52 between fluid ducts 60 and 61, thereby stopping hydraulic motor 11 or moderating acceleration of hydraulic motor 11. Afterward, while motor control arms 20 and 22 are rotated to maximum angle θ in forward or backward traveling direction X or Y, leak valve 57 is closed so as to prevent fluid from being bypassed between fluid passages 42 and 43 through leak passage 52, whereby the vehicle is properly accelerated.

Advantages of leak valve 57 will be described. Valve member 57a is vertically disposed in perpendicular to pump control shaft 21, and inserted into center section 12, thereby requiring a small space in transaxle housing 2. This is advantageous in minimization of IHT 1. Leak passage 52 is made only by forming annular groove 57b in valve member 57a, thereby requiring no other member. This is advantageous in reduction of parts and costs and ease of assembly.

Leak valve 57 automatically opens and closes its leak passage 52 between fluid ducts 60 and 61 in association with the speed changing operation moving pump control arms 20 and 22 with swash plate 18. The certain shift range of valve member 57a as the opened-valve position C of leak valve 57 ensures the expanded neutral zone of the HST. Further, the fluid-tightly fitting of valve member 57a to center section 12 in valve chamber 58 prevents loss of fluid when fluid is passed between fluid ducts 60 and 61 through leak passage 52. In other words, to ensure the neutral state of the HST, opened leak valve 57 leaks the fluid in higher-pressurized fluid duct 42 or 43 to lower-pressurized fluid duct 43 or 42, and does not leak to the fluid sump out of center section 12 in transaxle housing 2, thereby silencing IHT 1 by preventing noise caused by leaking of fluid into the fluid sump.

Figure 7:
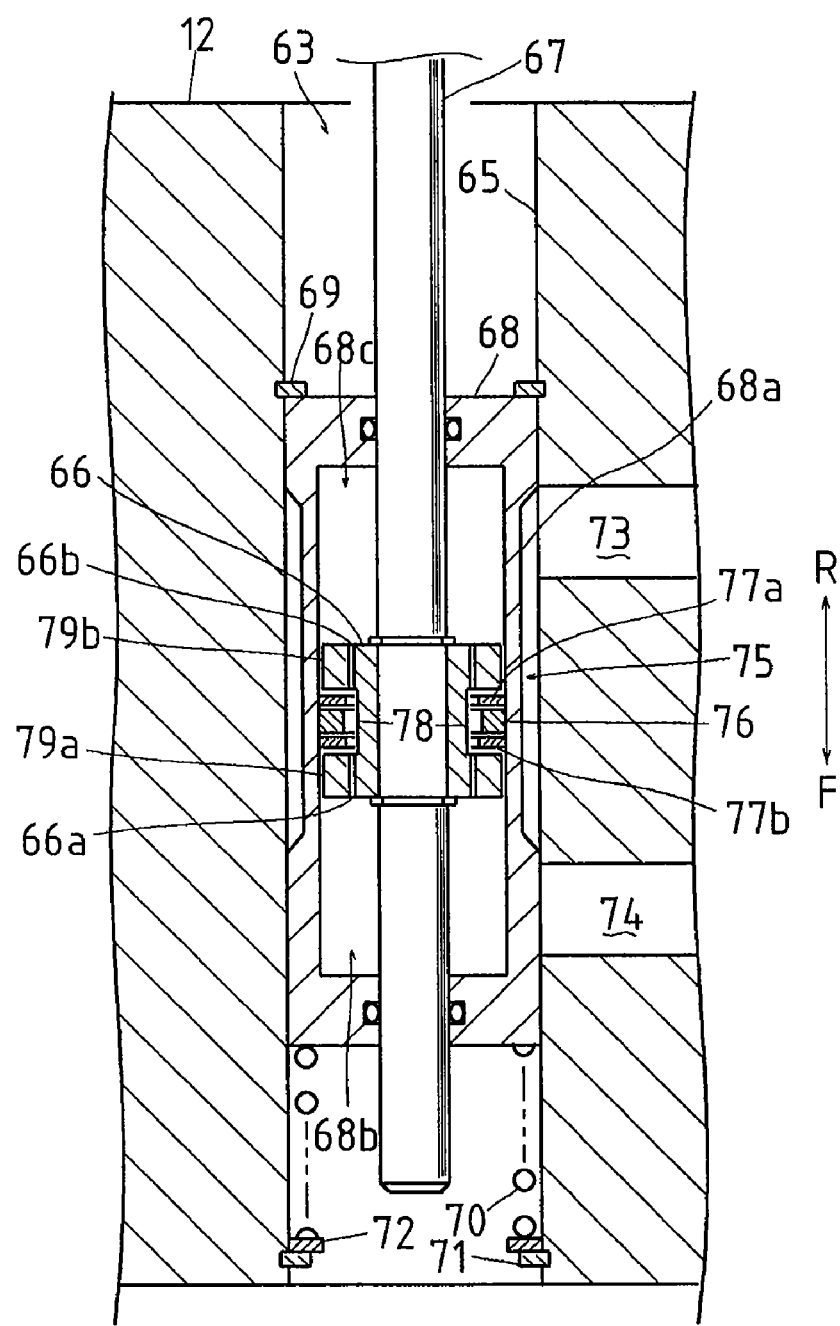
FIG. 7 is an enlarged sectional side view of a valve member of the leak valve according to the first embodiment.

In this embodiment, as shown in FIGS. 1, 6 and 7, a second leak valve 63 is fitted into center section 12 in addition to leak valve 57. Second leak valve 63 is provided for moderating change of speed of a vehicle even when the speed changing manipulator is quickly operated. More specifically, considering that the major cases of such a quick operation occur during forward traveling of the vehicle, second leak valve 63 is operated in correspondence to the quick speed changing operation in forward traveling of the vehicle.

A vertical cylinder hole 65 penetrates horizontal portion 12a of center section 12 adjacent to valve chamber 58 (leak valve 57). Second leak valve 63 is disposed vertically in perpendicular to pump control shaft 21, and extended downward into cylinder hole 65 from second arm portion 22b of pump control arm 22. In this regard, second leak valve 63 comprises a vertical piston rod 67 entering cylinder hole 65. A top portion of piston rod 67 is formed into a cam ring 67a, through which a horizontal pin 64 projecting from second arm portion 22b is passed. A vertical inner diameter of cam ring 67a substantially coincides with a diameter of pin 64 so that top and bottom ends of pin 64 substantially abut against the inner peripheral edge of cam ring 67a. Cam ring 67a is horizontally elongated so as to space the vertically intermediate outer peripheral surfaces of pin 64 from the inner peripheral edge of cam ring 67a. The rotational motion of pin 64 following the rotation of pump control arm 22 can be analyzed into vertical motion and horizontal motion. The horizontal motion of pin 64 is absorbed by the space in cam ring 67a, and the vertical motion of pin 64 is directly transmitted to piston rod 67 via cam ring 67a, thereby vertically moving piston rod 67. In this way, cam ring 67a converts the rotation of pump control arms 22 and 20 into the vertical motion of piston rod 67.

As best shown in FIG. 7, an upper horizontal fluid duct 73 connected to fluid duct 42 and a lower horizontal fluid duct 74 connected to fluid duct 43 are formed in center section 12 in vertically parallel, and open to cylinder hole 65. A cylindrical second piston 68 is vertically slidably and fluid-tightly fitted in cylinder hole 65. However, second piston 68 is narrowed or notched at a vertically intermediate outer peripheral portion so as to form an annular groove serving as a leak passage 75, which can be fluidly connected to one or both of fluid ducts 73 and 74 depending upon the vertical slide position of second piston 68 in cylinder hole 65.

An upper retaining ring 69 and a lower retaining ring 71 are fixed to the inner peripheral surface of center section 12 in cylinder hole 65 so as to define upper and lower slide limit positions of second piston 68. In cylinder hole 65 below second piston 68, a spring retaining ring 72 is placed on an upper surface of lower retaining ring 69, and a spring 70 is compressed between a bottom end surface of second piston 68 and spring retaining ring 72. Spring 70 biases second piston 68 upward so as to initially press the top edge of second piston 68 against upper retaining ring 69. When second piston 68 abuts against upper retaining ring 69, as shown in FIG. 7, leak passage 75 is opened to upper fluid duct 73, and separated from lower fluid duct 74. This position of second piston 68 is defined as an closed-valve position of second leak valve 63. Second piston 68 can slide downward to a certain stroke in cylinder hole 65 against spring 70. By the downward slide of second piston 68, leak passage 75 becomes open to both fluid ducts 73 and 74 so as to pass fluid in higher-pressurized fluid duct 42 or 43 to lower-pressurized fluid duct 43 or 42 via leak passage 75. Such a position of second piston 68 for opening leak passage 75 to both fluid ducts 73 and 74 is defined as a opened-valve position of second leak valve 63.

Piston rod 67 slidably penetrates second piston 68. A first piston 66 is fixed on an axially (vertically) intermediate portion of piston rod 67, and is vertically slidably fitted in a piston chamber 68a formed in second piston 68. A lower chamber 68b below first piston 66 in second piston 68 and an upper chamber 68c above first piston 66 in second piston 68 are filled up with damper fluid. Upper and lower chambers 68b and 68c are fluidly connected to each other via orifices 66a and 66b and an annular recess 78 formed in first piston 66, and fluidly separated from cylinder hole 65 and leak passage 75 by second piston 68.

First piston 66 is annularly recessed toward a vertical center axis thereof at a vertically intermediate portion thereof, so as to form annular groove 78. A seal ring 76, an upper washer 77a above seal ring 76, and a lower washer 77b below seal ring 76 are vertically slidably disposed around second piston 68 in annular groove 78. In this regard, the vertical width of annular groove 78 is determined to be larger than the total vertical thickness of seal ring 76 and washers 77a and 77b. Further, the inner peripheral surfaces of seal ring 76 and washers 77a and 77b are spaced from the outer peripheral surface of first piston 66 in annular groove 78. As a result, a vertical fluid passage is ensured along first piston 66 in annular groove 78. On the other hand, the outer peripheral surface of seal ring 76 (and the outer peripheral surfaces of washers 77a and 77b, if possible) slidably and fluid-tightly abuts against the inner peripheral surface of second piston 68 in piston chamber 68a.

Vertical lower orifices 66a penetrate a lower portion of first piston 66 between lower chamber 68b and the fluid passage in annular groove 78, and vertical upper orifices 66b penetrate an upper portion of first piston 66 between upper chamber 68c and the fluid passage in annular groove 78, thereby ensuring the fluidal communication between upper and lower chambers 68c and 68b.

Additionally, the outer peripheral surface of the lower portion of first piston 66 penetrated by lower orifices 66a is spaced from the inner peripheral surface of second piston 68 in piston chamber 68a so as to ensure a lower annular passage 79a. The outer peripheral surface of the upper portion of first piston 66 penetrated by upper orifices 66b is spaced from the inner peripheral surface of second piston 68 in piston chamber 68a so as to ensure an upper annular passage 79b.

Due to the above-mentioned total thickness setting of seal ring 76 and washers 77a and 77b relative to the vertical width of annular groove 78, lower washer 77b can be spaced from an upward bottom surface of first piston 66 in annular groove 78 so as to connect lower annular passage 79a to the fluid passage in annular groove 78, and upper washer 77a can be spaced from a downward ceiling surface of first piston 66 in annular groove 78 so as to connect upper annular passage 79b to the fluid passage in annular groove 78. If seal ring 76 is disposed at the vertically middle position in annular groove 78, both washers 77a and 77b are spaced from the bottom and ceiling surfaces of second piston 66 in annular groove 78 so as to open both annular passages 79b and 79a to the fluid passage in annular groove 78, thereby ensuring fluidal communication between upper and lower chambers 68c and 68b.

When the vehicle travels forward and pump control arm 22 is slowly rotated in direction X so as to increase the forward traveling speed of the vehicle, piston rod 67 can slide downward relative to second piston 68 biased upward by spring 70, so that first piston 66 slides downward in piston chamber 68a in an acceleration direction F. During the downward slide of first piston 66, seal ring 76 and washers 77a and 77b in annular groove 78 move upward relative to first piston 66, so as to close upper annular passage 79b. The damper fluid in lower chamber 68b is compressed by the downward slide of first piston 66, and resists against first piston 66. However, the damper fluid in lower chamber 68b is gradually released to upper chamber 68c via lower annular passage 79a and lower and upper orifices 66a and 66b. As a result, the resistance of fluid in lower chamber 68b against first piston 66 is reduced so as to allow first piston 66 to slide slowly downward relative to second piston 68 in acceleration direction F, thereby keeping second piston 68 at the initial closed-valve position of second leak valve 63 for separating fluid duct 73 from fluid duct 74.

When the vehicle travels forward and pump control arm 22 is quickly rotated in direction X for increasing the forward traveling speed of the vehicle, piston rod 67 quickly slides downward. Due to the quick motion of piston rod 67, fluid released from lower chamber 68b to upper chamber 68c through first piston 66 is insufficient, so that the resistance of the damper fluid in lower chamber 68b becomes too large to allow the downward slide of first piston 66 together with piston rod 67 relative to second piston 68 in acceleration direction F. Therefore, second piston 68 slides downward together with first piston 66 (substantially keeping the volumes of chambers 68b and 68c) in cylinder hole 65 against spring 70, thereby being shifted to the opened-valve position of second leak valve 63. In this way, fluid duct 74 is connected to fluid duct 73 through leak passage 75 so that suddenly pressurized fluid in higher-pressurized fluid duct 42 is bypassed to lower-pressurized fluid duct 43, thereby moderating change of hydraulic pressure in the HST circuit, i.e., moderating acceleration of the forwardly traveling vehicle.

Afterward, when the speed changing manipulator reaches a target position, lowered piston rod 67 and first piston 66 stop. The damper fluid in lower chamber 68b, while lowered first piston 66 is stationary, is compressed by the upward force of spring 70, and released to upper chamber 68c through lower annular passage 79a and orifices 66a and 66b. As a result, the resistance of fluid in lower chamber 68b against upwardly biased second piston 68 is reduced, so that second piston 68 slides upward in a deceleration direction R and returns to the initial closed-valve position of second leak valve 63, whereby fluid in higher-pressurized fluid duct 42 is fully used for driving hydraulic motor 11.

Whether slowly or quickly pump control arm 22 is rotated in direction Y so as to decrease the forward traveling speed of the vehicle, piston rod 67 slides upward so that first piston 66 slides upward in piston chamber 68a in deceleration direction R. At this time, second piston 68 biased upward by spring 70 is retained at the initial closed-valve position of second leak valve 63 by upper retaining ring 69. During the upward slide of first piston 66, seal ring 76 and washers 77a and 77b in annular groove 78 move downward relative to first piston 66, so as to close lower annular passage 79a. The damper fluid in upper chamber 68c is compressed by the upward slide of first piston 66 and resists against first piston 66. However, the damper fluid in upper chamber 68c is gradually released to lower chamber 68b via upper annular passage 79b and upper and lower orifices 66b and 66a. As a result, while second piston 68 is kept at the initial closed-valve position of second leak valve 63, first piston 66 slides slowly upward relative to second piston 68 in deceleration direction R while receiving fluidal resistance from upper chamber 68c, thereby preventing sudden rotation of motor control arms 20 and 22 and swash plate 18, i.e., preventing sudden deceleration of the vehicle.

In this way, according to the first embodiment, leak valve 57 expands the neutral zone of the HST so as to moderate starting and stopping of the vehicle, and second leak valve 63 reduces change of displacement of the HST so as to moderate acceleration of the vehicle, whereby the vehicle is safe from shock.

Additionally, when each of leak valves 57 and 63 is opened, fluid in higher-pressurized fluid duct 42 or 43 is not released to the fluid sump out of center section 12 in transaxle housing 2, but released to lower-pressurized fluid duct 43 or 42, thereby silencing IHT 1 by preventing noise caused by fluid leaking out into the fluid sump in transaxle housing 2.

IHT 1 according to a second embodiment will now be described with reference to FIGS. 9 to 12, wherein leak valve 57 is used for leaking fluid from higher-pressurized fluid duct 42 or 43 not to lower-pressurize fluid duct 43 or 42, but to the fluid sump out of center section 12 in transaxle housing 2 through a leak port member 84 or 85, thereby preventing sudden change of hydraulic pressure in the HST, especially considering the change of hydraulic pressure when the moving speed changing manipulator is stopped and when the speed changing manipulator is operated to change the forward and backward travel direction of the vehicle. The same parts and directions are designated by the same reference numerals as those in the first embodiment, and description thereof will be omitted.

Figure 9:
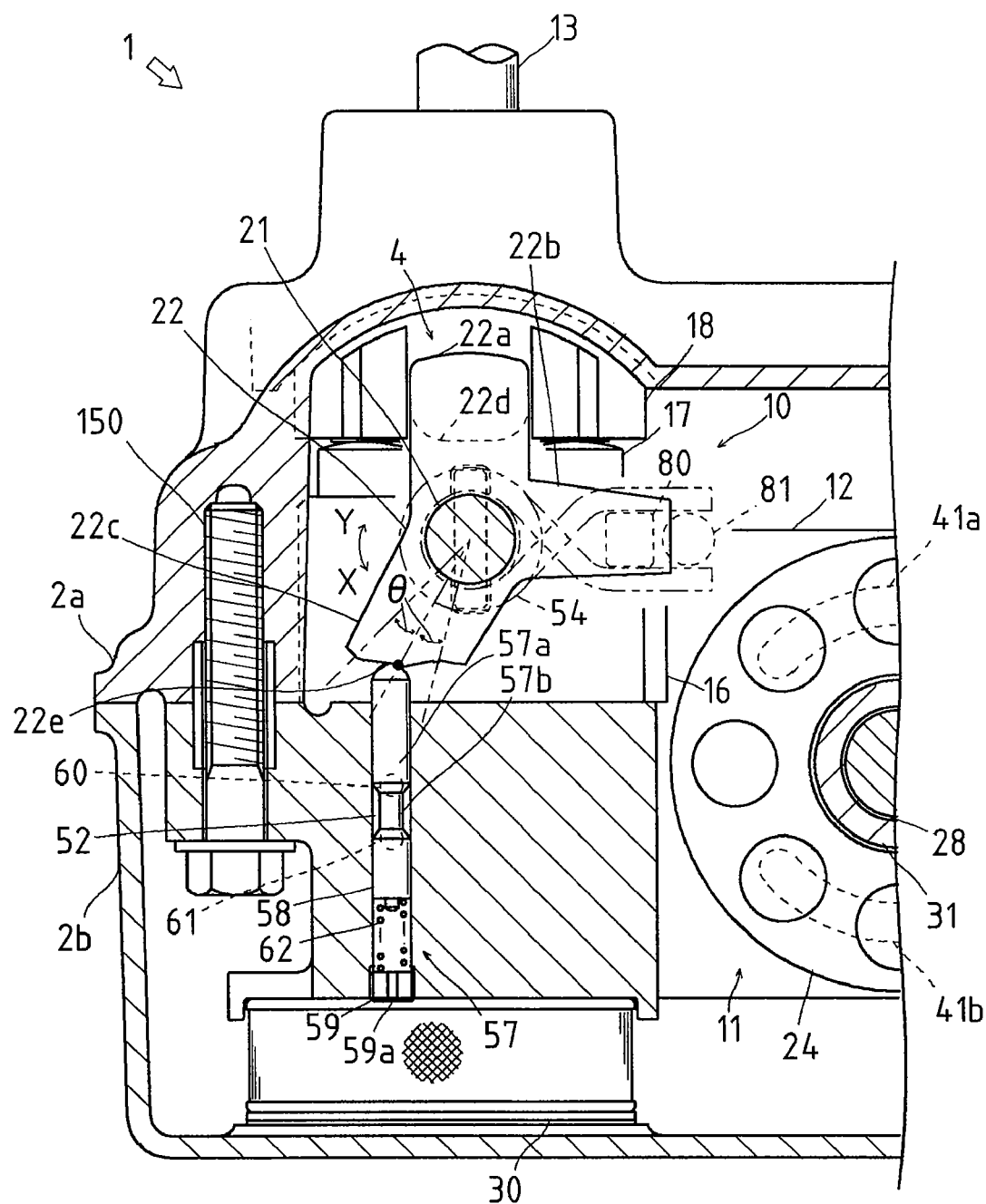
FIG. 9 is a fragmentary sectional side view of the IHT with a leak valve according to a second embodiment.

As best shown in FIG. 9, leak valve 57, provided with valve member 57a, spring 62, and plug 59 having passage 59a, is fitted in valve chamber 58 vertically penetrating center section 12 in the same way as leak valve 57 of the first embodiment, and inner pump control arm 22, especially third arm portion 22c, is shaped to correspond to leak valve 57 in the same way as inner pump control arm 22 of the first embodiment. However, neutral-returning spring 54 is coiled around pump control shaft 21 in transaxle housing 2 so as to be protected from rust and obstacles in the outside of transaxle housing 2, and the different point of inner pump control arm 22 from that of the first embodiment is to use second arm portion 22b for engaging with spring 54. A projection (or a pin) 80 integrally projects from second arm portion 22b, and a retaining pin 81 is screwed into a sidewall of transaxle housing 2 (upper housing half 2a). Both end portions of spring 54 are twisted, crossed and extended so as to nip projection 80 and retaining pin 81.

Figure 10:
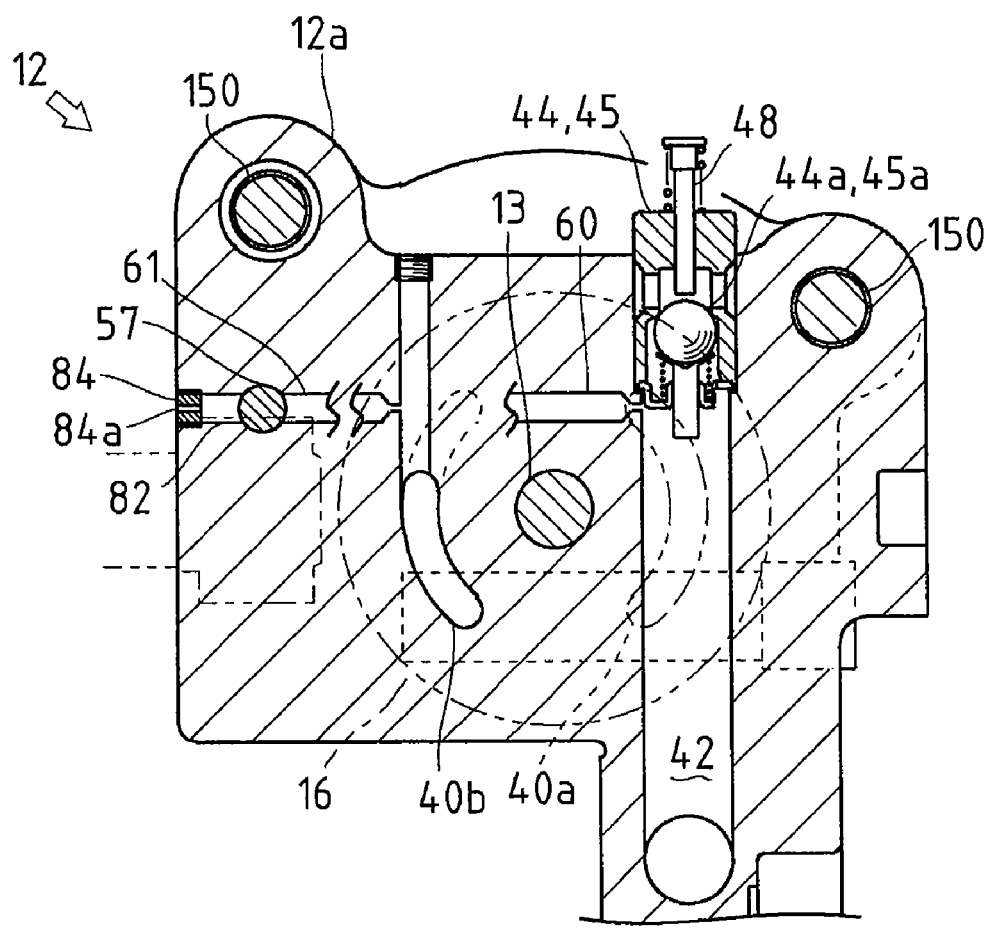
FIG. 10 is an enlarged sectional plan view of a center section with the leak valve according to the second embodiment.
Figure 11:
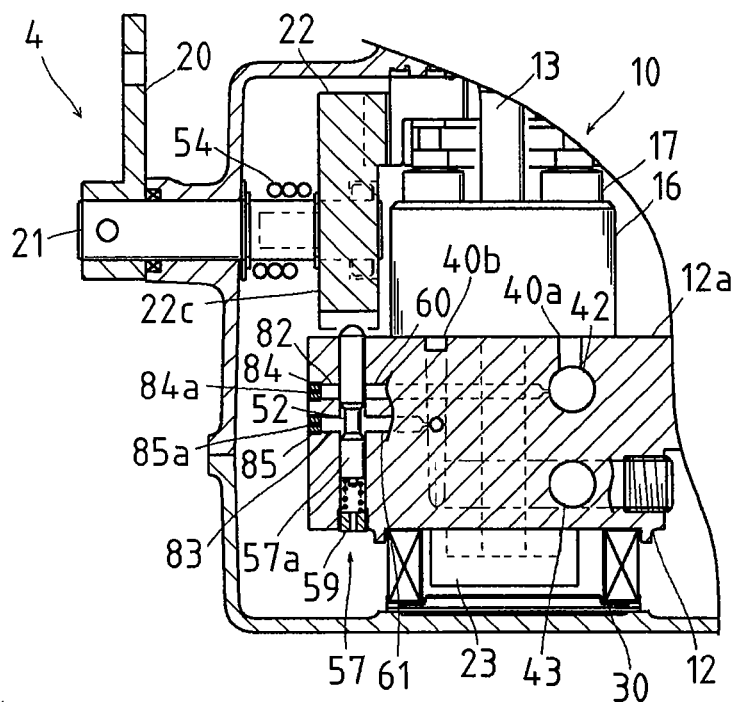
FIG. 11(a) is a fragmentary sectional rear view of the IHT with the leak valve according to the second embodiment when a pump control device is set for forward traveling.
FIG. 11(b) is fragmentary sectional rear view of the IHT with the leak valve according to the second embodiment when the pump control device is set in neutral.
Figure 11:
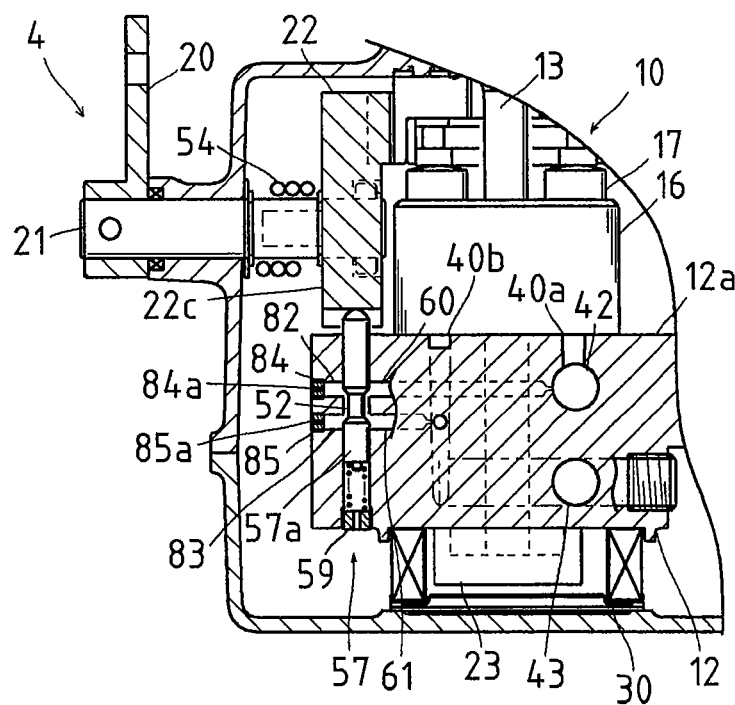

As shown in FIGS. 10, 11(a) and 11(b), a pair of upper and lower leak ports 82 and 83 are extended from valve chamber 58 coaxially opposite to respective fluid ducts 60 and 61, and opened outward at a side surface of center section 12 to the fluid sump in transaxle housing 2. Upper and lower leak ports 82 and 83 are plugged at the outward openings thereof by respective leak port members 84 and 85 penetrated by respective orifices 84a and 85a. Therefore, leak ports 82 and 83 are fluidly connected via respective orifices 84a and 85a to the fluid sump in transaxle housing 2 out of center section 12.

As shown in FIG. 11(b), when the vehicle is stationary, i.e., pump control arms 20 and 22 and swash plate 18 are disposed at the neutral position, valve member 57a of leak valve 57 is disposed at the initial opened-valve position, where leak passage 52 between valve member 57a and valve chamber 58 is opened to both fluid ducts 60 and 61 and both leak ports 82 and 83. This state is represented by a neutral position A of leak valve 57 in FIG. 12. A certain vertical shift range of valve member 57a is provided for establishing neutral position A of leak valve 57, thereby expanding the neutral zone of the HST.

Figure 12:
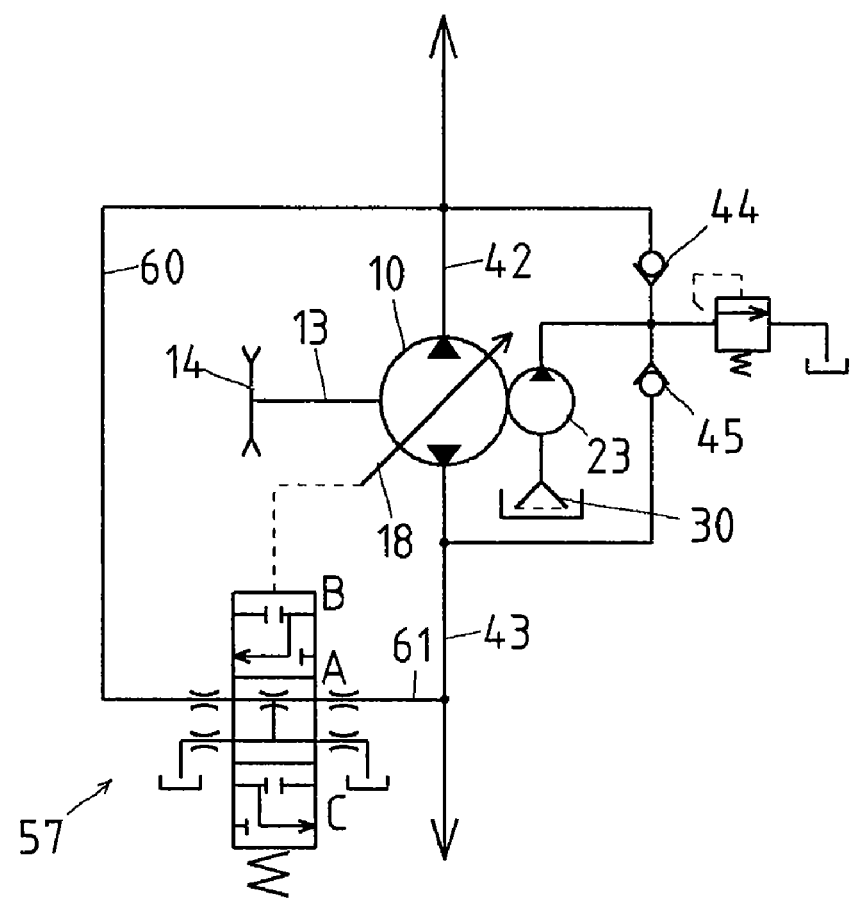
FIG. 12 is a diagram of a hydraulic circuit for the leak valve according to the second embodiment.

Due to the shape of second arm portion 22c of pump control arm 22, when pump control arms 20 and 22 are rotated in forward traveling direction X from the neutral position, valve member 57a slides downward in center section 12 so that the opening of upper fluid duct 60 is gradually decreased and finally closed by the outer peripheral surface of valve member 57a, as shown in FIG. 11(a), so as to establish a forward traveling position B of leak valve 57 in FIG. 12, where high-pressurized fluid ducts 42 and 60 and leak port 82 are shut off from the fluid sump in transaxle housing 2 out of center section 12, and lower-pressurized fluid ducts 43 and 61 and leak port 83 are open to the fluid sump via orifice 85a. The gradual reduction of the opening of fluid duct 60 moderates acceleration of the vehicle.

After leak valve 57 reaches forward traveling position B shown in FIG. 12, for the very moment that the speed changing manipulator is stopped at a target position so as to stop the increase of fluid delivered from hydraulic pump 10, accelerated hydraulic motor 11 is still going to increase its rotary speed by its inertial force, so that fluid duct 42 having been higher-pressurized becomes lower-pressurized, and fluid duct 43 having been lower-pressurized becomes higher-pressurized. However, since fluid duct 61 is opened to leak port 83 via leak passage 52 in valve chamber 58, the suddenly higher-pressurized fluid in fluid duct 43 is drained to the fluid sump out of center section 12 via orifice 85a, thereby moderating stopping of acceleration of the vehicle.

Afterward, the speed changing manipulator is operated for deceleration of the forward-traveling vehicle so that pump control arms 20 and 22 are rotated in direction Y so as to raise valve member 57a, thereby shifting leak valve 57 from forward traveling position B to neutral position A. In this way, leak passage 52 is opened to both fluid ducts 60 and 61 and to both leak ports 82 and 83 so as to drain excessively higher-pressurized fluid in fluid duct 42 or 43 to the fluid sump just before the vehicle stops, whereby the vehicle can stop without shock.

Further, when the speed changing manipulator is operated so that pump control arms 20 and 22 having been disposed in direction X from the neutral position are rotated in direction Y through the neutral position so as to change the travel direction of the vehicle from forward to backward and accelerate the backward traveling speed of the vehicle, raised valve member 57a gradually reduces the opening of fluid duct 61 so as to moderate the backward traveling start of the vehicle, and finally reaches backward traveling position C of leak valve 57 shown in FIG. 12, where high-pressurized fluid ducts 43 and 61 and leak port 83 are shut off the fluid sump in transaxle housing 2 out of center section 12, and lower-pressurized fluid ducts 42 and 60 and leak port 82 are open to the fluid sump via orifice 84a. Afterward, even if the speed changing manipulation for acceleration of backward traveling is suddenly stopped at a target backward traveling speed position, opened leak valve 57 drains the higher-pressurized fluid from fluid duct 42 and 60 to the fluid sump so as to moderate stopping of backward traveling acceleration of the vehicle.

In this way, leak valve 57 can moderate stopping and starting of the vehicle at the moment of change of the forward/backward traveling direction of the vehicle, i.e., expand the neutral zone of the HST, and also moderate stopping of acceleration for getting a target speed in each of forward and backward travels of the vehicle.

IHT 1, including a detent pin 86 and first and second leak valves 87 and 88, according to a third embodiment will be described with reference to FIGS. 13 to 17. Center section 12 is bored by an upwardly open vertical hole below the lower edge of third arm portion 22c of inner pump control arm 22. Third arm portion 22c is shaped for defining positions of first and second leak valves 87 and 88 in the above-mentioned way in the first and second embodiments. Detent pin 86 is slidably fitted into the vertical hole via an upwardly biasing spring 90. Detent pin 86 has a tapered head, which projects upward from the upper surface of horizontal portion 12a of center section 12 so as to be pressed against the lower edge of third arm portion 22c, thereby ensuring an accurate rotational position of pump control arms 20 and 22 and swash plate 18. Pump control arms 20 and 22 are retained at any position by detent pin 86 unless they are rotated by the speed changing manipulation.

First leak valve 87 is provided for bypassing fluid between fluid ducts 42 and 43 in the HST when the vehicle having traveled forward stops or travels backward, and second leak valve 88 is provided for bypassing fluid between fluid ducts 42 and 43 in the HST when the vehicle having traveled backward stops or travels forward. First and second leak valve 87 and 88 are combined to define a leak valve 57 shown in FIG. 17.

Referring to FIGS. 13 to 16, each of first and second leak valves 87 and 88 will be described. Adjoining vertical valve holes 92 and 106 penetrate horizontal portion 12a of center section 12.

Referring to first leak valve 87, a first valve member 91 is vertically slidably fitted in valve hole 92. The major outer peripheral surface of valve member 91 slidably and fluid-tightly fit to the inner peripheral surface of center section 12 in valve hole 92. Valve member 91 is diametrically narrowed or peripherally cut away in part so as to form upper and lower diametrical small portions 91a and 91b, which ensure upper and lower leak passages 102 and 103 therearound in valve hole 92. Upper diametrically small portion 91a defining upper leak passage 102 is vertically longer than lower diametrically small portion 91b defining lower leak passage 103.

A cap 98 is fitted upwardly into valve hole 92 so as to cover the downward opening of valve hole 92; however, cap 98 has an orifice opened to the fluid sump in housing 2 out of center section 12. In cap 98, a spring 99 is interposed between bottom ends of valve member 91 and cap 98 so as to bias valve member 91 upward.

As best shown in FIGS. 16(a) and 16(b), horizontal portion 12a of center section 12 is bored by a horizontal upper fluid duct 100 extended from fluid duct 42 through valve hole 92 so as to open outward to the fluid sump at a vertical side surface of horizontal portion 12a of center section 12, and bored by a horizontal lower fluid duct 101 extended from fluid duct 43 through valve hole 92 so as to open outward to the fluid sump at the same vertical side surface of horizontal portion 12a. The outward openings of fluid ducts 100 and 101 at the vertical side surface of center section 12 are plugged by respective plugs.

A damper 93 serving as a lost motion system is provided in second arm portion 22b of inner pump control arm 22 in correspondence to first leak valve 87. In this regard, second arm portion 22b is bored by a downwardly open vertical hole 95, into which a slide member 96 is vertically slidably and fluid-tightly fitted, and a spring 97 for downwardly biasing slide member 96 is inserted. A closed bottom end of slide member 96 projects downward from the bottom surface of second arm portion 22b so as to be pressed against a top end of valve member 91 projecting upward from horizontal portion 12a of center section 12. The force of spring 99 for upwardly biasing valve member 91 is slightly larger than the force of spring 97 for downwardly biasing slide member 96.

First leak valve 87 is provided with a check valve 113 interposed between upper and lower fluid ducts 100 and 101 opposite to fluid ducts 42 and 43 with respect to valve hole 92. Check valve 113 has a downwardly biased valve ball and a valve seat below the valve ball, so as to allow fluid to flow from lower fluid duct 101 to upper fluid duct 100, and to prevent fluid from flowing from upper fluid duct 100 to lower fluid duct 101. That is, when leak passage 102 is opened to fluid duct 101, and fluid duct 43 is hydraulically higher-pressurized, the higher-pressurized fluid led into leak passage 102 from fluid duct 43 can open check valve 113, i.e., push up the valve ball apart from the valve seat.

Referring to second leak valve 88, a second valve member 105 is vertically slidably fitted in valve hole 106. The major outer peripheral surface of valve member 105 slidably and fluid-tightly fit to the inner peripheral surface of center section 12 in valve hole 106. Valve member 105 is diametrically narrowed or peripherally cut away in part so as to form upper and lower diametrical small portions 105a and 105b, which define upper and lower leak passages 111 and 112 therearound in valve hole 106. Lower diametrically small portion 105b defining lower leak passage 112 is vertically longer than upper diametrically small portion 105a defining upper leak passage 111, and longer than a vertical gap between a bottom end of upper fluid duct 109 and a top end of lower fluid duct 110.

A cap 108 is fitted upwardly into valve hole 106 so as to cover the downward opening of valve hole 106; however, cap 108 has an orifice opened to the fluid sump in housing 2 out of center section 12. In cap 108, a spring 107 is interposed between bottom ends of valve member 105 and cap 108 so as to bias valve member 105 upward.

A top end of valve member 105 projects upward from the top surface of horizontal portion 12a of center section 12, and is pressed against the bottom surface of solid second arm portion 22b of inner pump control arm 22 by the upward biasing force of spring 107.

As best shown in FIGS. 15(a) and 15(b), horizontal portion 12a of center section 12 is bored by an upper outwardly open horizontal fluid duct 109 extended from fluid duct 42 through valve hole 106 in horizontally parallel to fluid duct 100 so as to open outward to the fluid sump at the vertical side surface of horizontal portion 12a of center section 12, where fluid ducts 100 and 101 are also open outward, and bored by a lower outwardly open horizontal fluid 110 extended from fluid duct 43 through valve hole 106 in horizontally parallel to fluid duct 101 so as to open outward to the fluid sump at the same vertical side surface of horizontal portion 12a. The outward openings of fluid ducts 109 and 110 at the vertical side surface of center section 12 are plugged by respective plugs.

Second leak valve 88 is provided with a check valve 114 interposed between upper and lower fluid ducts 109 and 110 opposite to fluid ducts 109 and 110 with respect to valve hole 106. Check valve 114 has an upwardly biased valve ball and a valve seat above the valve ball, so as to allow fluid to flow from upper fluid duct 109 to lower fluid duct 110, and to prevent fluid from flowing from lower fluid duct 110 to upper fluid duct 109. That is, when leak passage 111 is opened to fluid duct 109, and fluid duct 42 is hydraulically higher-pressurized, the higher-pressurized fluid led into leak passage 111 from fluid duct 42 can open check valve 114, i.e., push down the valve ball apart from the valve seat.

Figure 13:
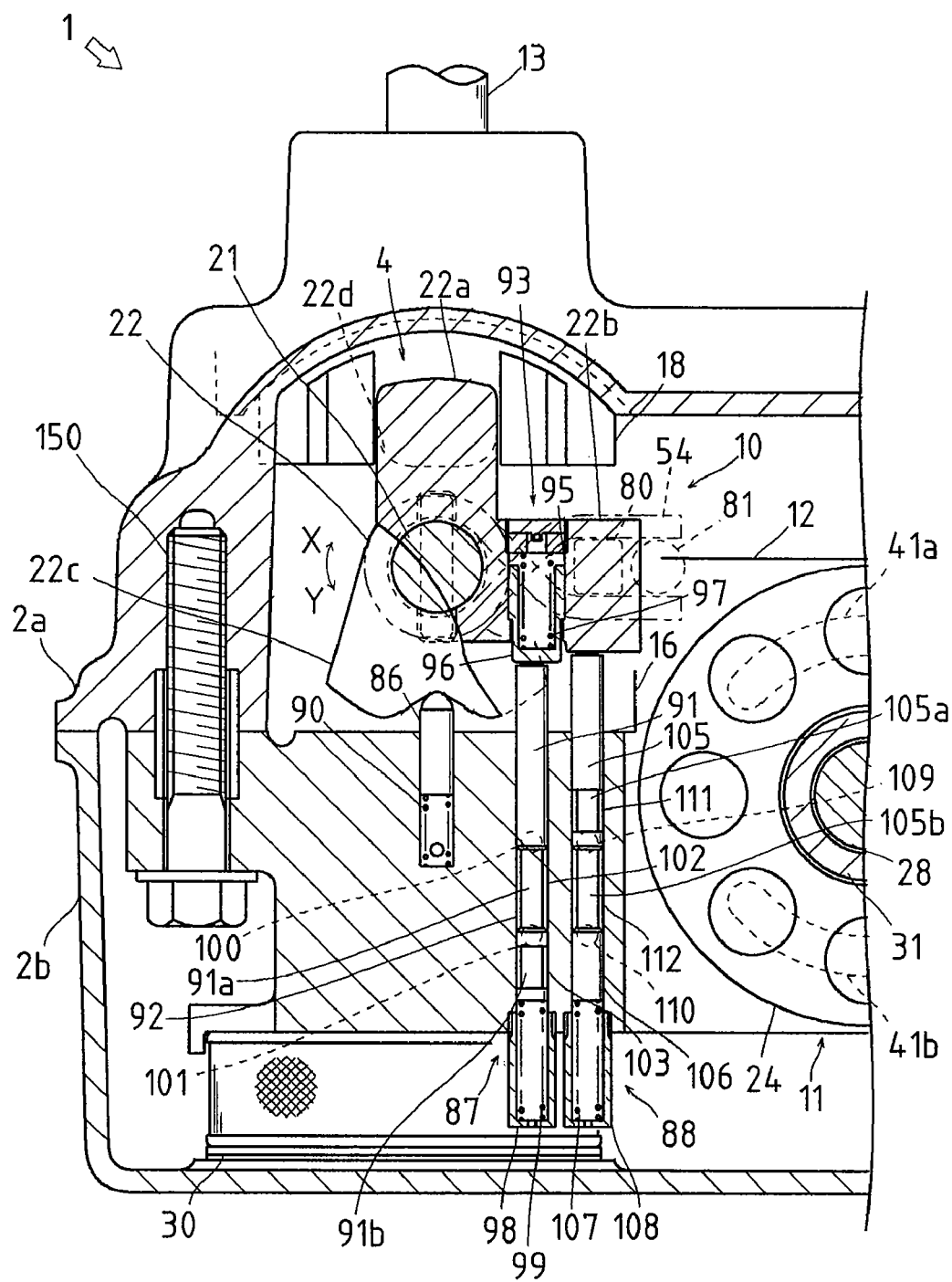
FIG. 13 is a fragmentary sectional side view of the IHT with first and second leak valves according to a third embodiment.
Figure 14:
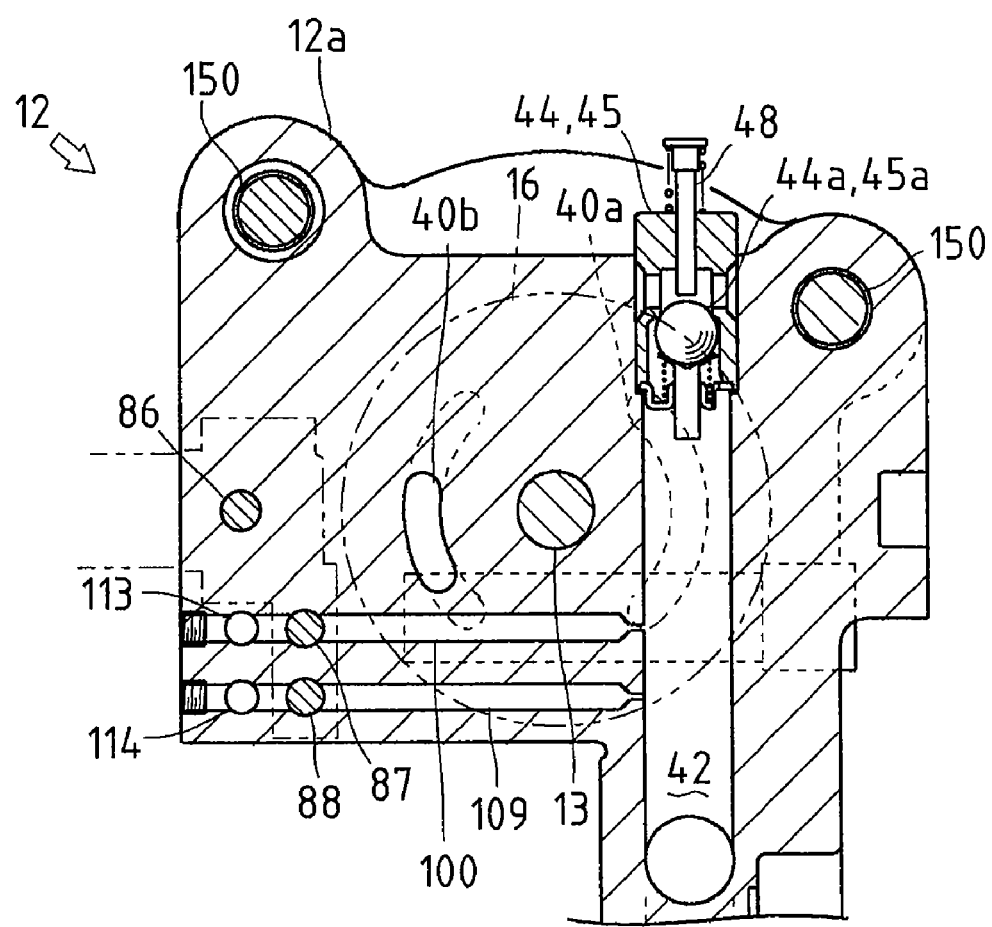
FIG. 14 is an enlarged sectional plan view of the center section with the first and second leak valves according to the third embodiment.
Figure 15:
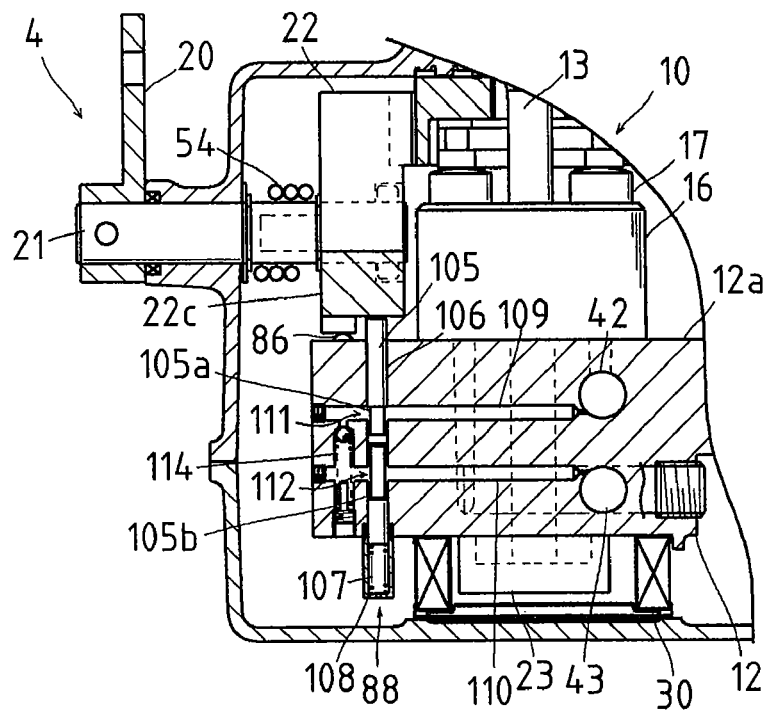
FIG. 15(a) is a fragmentary sectional rear view of the IHT showing the second leak valve when the pump control device is set for forward traveling.
FIG. 15(b) is fragmentary sectional rear view of the IHT with the second leak valve when the pump control device is set in neutral.
Figure 15:
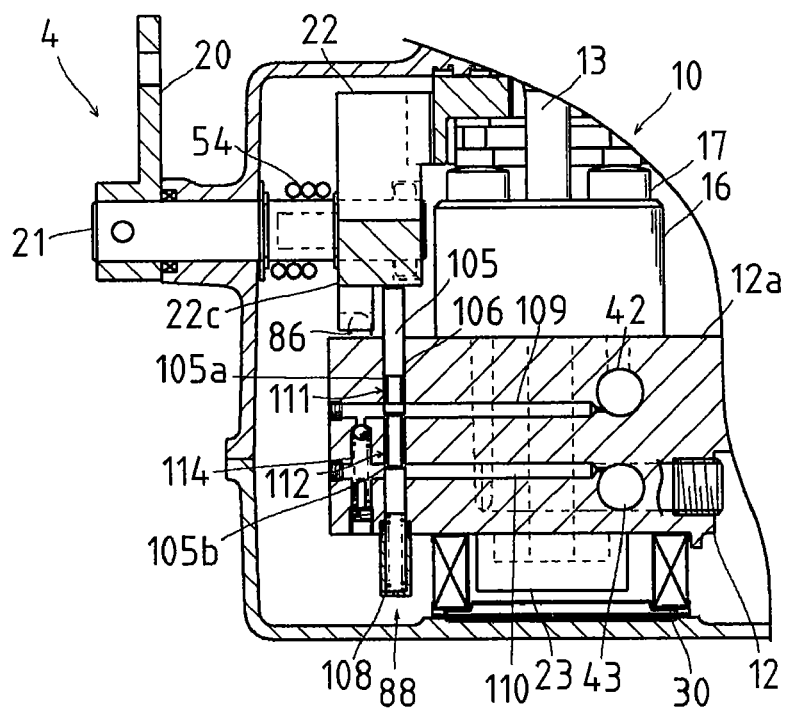
Figure 16:
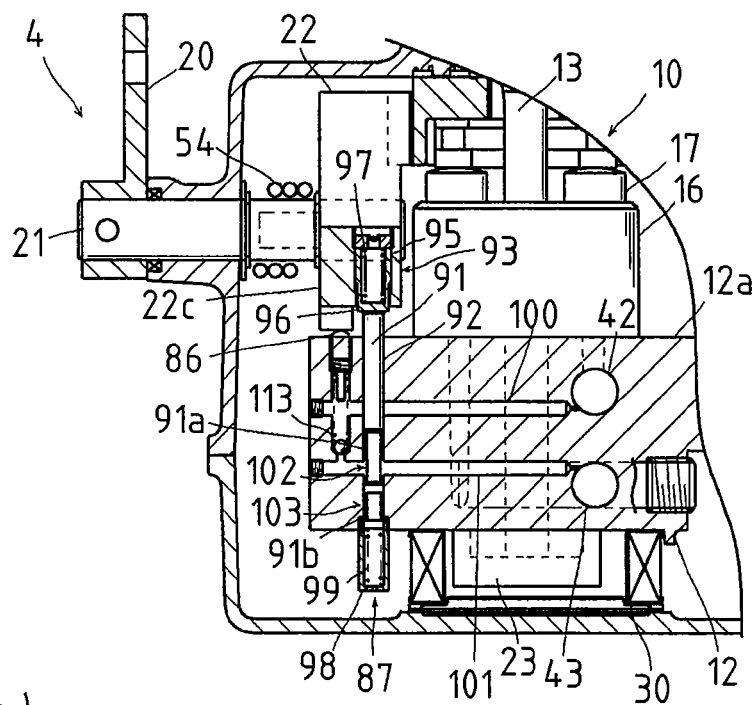
FIG. 16(a) is a fragmentary sectional rear view of the IHT showing the first leak valve when the pump control device is set for forward traveling.
FIG. 16(b) is fragmentary sectional rear view of the IHT with the first leak valve when the pump control device is set in neutral.
Figure 16:
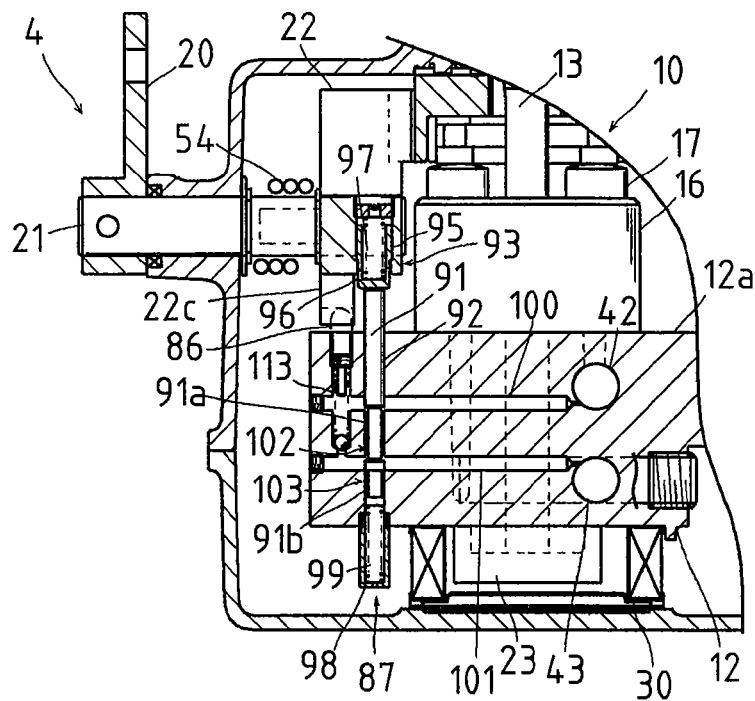
Figure 17:
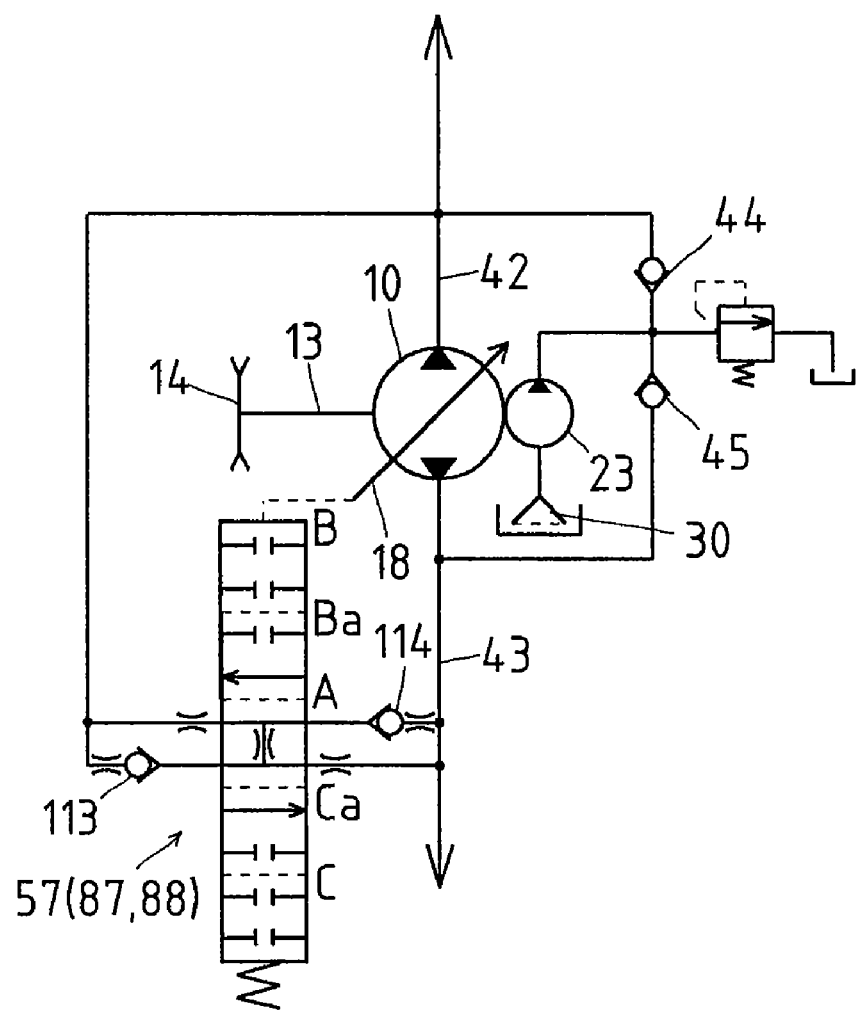
FIG. 17 is a diagram of a hydraulic circuit for the leak valve (the first and second leak valves) according to the third embodiment.

Shift of leak valves 87 and 88 and effect thereof will be described. When pump control arms 20 and 22 are disposed at the neutral position, as shown in FIGS. 13 and 16(b), in first leak valve 87, upper diametrically small portion 91a of first valve member 91 is disposed between the openings of upper and lower fluid ducts 100 and 101 in valve hole 92 so as to open upper leak passage 102 to both fluid ducts 100 and 101. Simultaneously, as shown in FIGS. 13 and 15(b), in second leak valve 88, lower diametrically small portion 105b of second valve member 105 is disposed between the openings of upper and lower fluid ducts 109 and 110 in valve hole 106 so as to open lower leak passage 112 to both fluid ducts 109 and 110. Therefore, fluid can pass through both leak passages 102 and 112 between fluid ducts 42 and 43 of the HST. However, the diametrically large portions of valve member 91 throttle the openings of fluid ducts 100 and 101 in valve hole 92, and the diametrically large portions of valve member 105 throttle the openings of fluid ducts 109 and 110 in valve hole 106. This neutral state of first and second leak valves 87 and 88 is defined as a neutral position A of leak valve 57 in FIG. 17.

Referring to FIG. 13, when pump control arms 20 and 22 are rotated in a direction X for forward traveling from the neutral position, second arm portion 22b is lowered so as to push down valve members 91 and 105 in respective valve holes 92 and 106. For the early period of this rotation of pump control arms 20 and 22, the throttled openings of fluid ducts 100 and 101 still communicate with each other through upper leak passage 102 in first leak valve 87, and the throttled openings of fluid ducts 109 and 110 still communicate with each other through lower leak passage 112 in second leak valve 88. In this way, a small amount of fluid leaks from higher-pressurized fluid duct 42 to lower-pressurized fluid duct 43 through leak passages 102 and 112 so as to moderate start of forward traveling of the vehicle. In other words, neutral position A of leak valve 57 is kept for the early period of rotation of pump control arms 20 and 22 for forward traveling of the vehicle from the neutral position, so as to expand the neutral zone of the HST.

If the rotation of pump control arms 20 and 22 in direction X from the neutral position is rapid, the expanded neutral zone of the HST defined as the neutral position A of leak valve 57 is almost canceled. However, in damper 93, spring 97 is compressed so as to delay the downward motion of slide member 96 after the rapid downward motion of second arm portion 22b. As a result, slide member 96 arises relative to lowered second arm portion 22b so as to reduce the downward motion speed of valve member 91, thereby ensuring the expanded neutral zone of the HST for forward traveling start of the vehicle regardless of the rapid rotation of pump control arms 20 and 22.

Afterward, while valve member 91 is pushed down by lowered second arm portion 22b, as shown in FIG. 16(a), upper diametrically small portion 91a of valve member 91 comes to face the opening of lower fluid duct 101 in valve hole 92 so as to open upper leak passage 102; however, the upper diametrically large portion of valve member 91 closes the opening of upper fluid duct 100 in valve hole 92 so as to prevent fluid from leaking from higher-pressurized fluid duct 42. Simultaneously, while valve member 105 is pushed down by lowered second arm portion 22b, as shown in FIG. 15(a), the openings of fluid ducts 109 and 110 in valve hole 106 become entirely open to respective upper and lower leak passages 111 and 112; however, the diametrically large portion of valve member 105 between diametrically small portions 105a and 105b is disposed between the openings of upper and lower fluid ducts 109 and 110 in valve hole 106 so as to prevent fluid from passing between leak passages 111 and 112. As a result, first leak valve 87 and check valve 113 are closed, and second leak valve 88 is closed, so as to ensure the proper displacement of hydraulic pump 10 determined by the tilt position of swash plate 18 for forward traveling of the vehicle. However, with respect to second leak valve 88, check valve 114 is ready to be opened by increase of hydraulic pressure in higher-pressurized fluid ducts 42 and 109, so as to prevent shock by sudden acceleration. This state of leak valves 87 and 88 is defined as a forward traveling position Ca of leak valve 57 in FIG. 17.

In forward traveling position Ca of leak valves 87 and 88, leak passages 111 and 112 do not communicate with each other in valve hole 106, however, they open to respective fluid ducts 109 and 110, and to respective opposite sides of check valve 114. When pump control arms 20 and 22 having been disposed at a position corresponding to forward traveling position Ca of leak valves 87 and 88 are suddenly rotated in direction X to increase forward traveling speed of the vehicle, higher-pressurized fluid duct 42 is further pressurized suddenly by the sudden rotation of pump control arms 20 and 22. However, the suddenly increased fluid in higher-pressurized fluid duct 42 flows into a part of fluid duct 109 just above check valve 114 through leak passage 111, and push down the valve ball apart from the valve seat, i.e., opens check valve 114 of second leak valve 88, thereby flowing to lower-pressurized fluid duct 43 through fluid duct 110 and leak passage 112. Therefore, the actual forward traveling acceleration of the vehicle is moderated regardless of sudden operation for increasing the forward traveling speed. Simultaneously, a part of fluid duct 101 just below check valve 113 communicates with fluid duct 43 through leak passage 103 opened to fluid duct 101; however, fluid duct 43 is lower-pressurized and the upper diametrically large portion of valve member 91 cuts off fluid duct 100 (i.e., separates leak passage 102 downward from fluid duct 100), thereby closing check valve 113 of first leak valve 87.

By further rotation of pump control arms 20 and 22 in direction X, the upper diametrically large portion of lowered valve member 105 finally comes to cross fluid duct 109 so as to separate leak passage 111 downward from fluid duct 109, i.e., close check valve 114. This condition that leak valves 87 and 88 and check valves 113 and 114 are closed is defined as a high-speed forward traveling position C of leak valves 87 and 88 (leak valve 57) in FIG. 17, for ensuring high efficiency of power transmission between hydraulic pump 10 and motor 11.

Referring to FIG. 13, when pump control arms 20 and 22 are rotated in direction Y for backward traveling from the neutral position, second arm portion 22b is raised so as to raise upwardly biased valve members 87 and 88 in respective valve holes 92 and 106. In the early period of this rotation of pump control arms 20 and 22, the throttled openings of fluid ducts 100 and 101 still communicate with each other through upper leak passage 102 in first leak valve 87, and the throttled openings of fluid ducts 109 and 110 still communicate with each other through lower leak passage 112 in second leak valve 88. In this way, a small amount of fluid leaks from higher-pressurized fluid duct 43 to lower-pressurized fluid duct 42 through leak passages 102 and 112 so as to moderate start of backward traveling of the vehicle. In other words, neutral position A of leak valve 57 is kept at the early period of rotation of pump control arms 20 and 22 for backward traveling of the vehicle from the neutral position.

Afterward, while valve member 105 biased upward by spring 107 arises with rising second arm portion 22b, lower diametrically small portion 105b of valve member 105 comes to face the opening of upper fluid duct 109 in valve hole 106 so as to open upper leak passage 111; however, the lower diametrically large portion of valve member 105 below diametrically small portion 105b closes the opening of lower fluid duct 110 in valve hole 106 so as to prevent fluid from leaking from higher-pressurized fluid duct 43. Simultaneously, while valve member 91 biased upward by spring 99 arises with rising second arm portion 22b, the openings of fluid ducts 100 and 101 in valve hole 92 become entirely open to respective upper and lower leak passages 102 and 103; however, the diametrically large portion of valve member 91 between diametrically small portions 91a and 91b is disposed between the openings of upper and lower fluid ducts 102 and 103 in valve hole 92 so as to prevent fluid from passing between leak passages 102 and 103. As a result, second leak valve 88 and check valve 114 are closed, and first leak valve 87 is closed, so as to ensure the proper displacement of hydraulic pump 10 determined by the tilt position of swash plate 18 for backward traveling of the vehicle. However, with respect to first leak valve 87, check valve 113 is ready to be opened by increase of hydraulic pressure in higher-pressurized fluid ducts 43 and 101, so as to prevent shock by sudden acceleration. This state of leak valves 87 and 88 is defined as a backward traveling position Ba of leak valve 57 in FIG. 17.

In backward traveling position Ba of leak valves 87 and 88, leak passages 100 and 101 do not communicate with each other in valve hole 92; however, they open to respective fluid ducts 100 and 101, and to respective opposite sides of check valve 113. When pump control arms 20 and 22 having been disposed at a position corresponding to backward traveling position Ba of leak valves 87 and 88 are suddenly rotated in direction Y to increase backward traveling speed of the vehicle, higher-pressurized fluid duct 43 is further pressurized suddenly by the sudden rotation of pump control arms 20 and 22. However, the suddenly increased fluid in higher-pressurized fluid duct 43 flows into a part of fluid duct 101 just below check valve 113 through leak passage 103, and pushes up the valve ball apart from the valve seat, i.e., opens check valve 113 of first leak valve 87, thereby flowing to lower-pressurized fluid duct 42 through fluid duct 100 and leak passage 102. Therefore, the actual backward traveling acceleration of the vehicle is moderated regardless of sudden operation for increasing the backward traveling speed. Simultaneously, a part of fluid duct 109 just above check valve 114 communicates with fluid duct 42 through leak passage 112 opened to fluid duct 109; however, fluid duct 42 is lower-pressurized and the lower diametrically large portion of valve member 105 below diametrically small portion 105b cuts off fluid duct 110 (i.e., separates leak passage 112 upward from fluid duct 110), thereby closing check valve 114 of second leak valve 88.

By further rotation of pump control arms 20 and 22 in direction Y, the lower diametrically large portion of rising valve member 91 finally comes to cross fluid duct 101 so as to separate leak passage 103 upward from fluid duct 101, i.e., close check valve 113. This condition that leak valves 87 and 88 and check valves 113 and 114 are closed is defined as a high-speed backward traveling position B of leak valves 87 and 88 (leak valve 57) in FIG. 17, for ensuring high efficiency of power transmission between hydraulic pump 10 and motor 11.

When the speed control manipulator disposed at a forward traveling speed position is shifted to a backward traveling speed position, control arms 20 and 22 are rotated in direction Y so as to raise valve members 91 and 105 so that leak valves 87 and 88 are shifted from forward traveling position Ca or C to backward traveling position Ba or B through neutral position A. During the shift of leak valves 87 and 88 in backward traveling position Ba for increasing backward traveling speed, check valve 113 is opened by increase of hydraulic pressure in fluid duct 43, thereby moderating backward acceleration. On the contrary, when the speed control manipulator disposed at a backward traveling speed position is shifted to a forward traveling speed position, control arms 20 and 22 are rotated in direction X so as to push down valve members 91 and 105 so that leak valves 87 and 88 are shifted from backward traveling position Ba or B to forward traveling position Ca or C through neutral position A. During the shift of leak valves 87 and 88 in forward traveling position Ca for increasing forward traveling speed, check valve 114 is opened by increase of hydraulic pressure in fluid duct 42, thereby moderating forward acceleration. Further, just before pump control arms 20 and 22 rotated from either forward or backward traveling speed position for deceleration reach the neutral position, both leak valve 87 and 88 are opened (shifted to expanded neutral zone A) so as to bypass fluid between fluid ducts 42 and 43 through leak passages 102 and 112, thereby moderating stopping of the vehicle. In this way, the vehicle can be prevented from being shocked during change of traveling direction between forward and backward.

IHT 1 according to the third embodiment is advantageously silent because leak valves 87 and 88 leak fluid between fluid ducts 42 and 43 of the closed fluid circuit of the HST and do not drain fluid to the fluid sump out of center section 12. Further, leak valves 87 and 88 are advantageous in that they are compactly disposed in center section 12 and shiftable with a simple structure using rotation of pump control arms 20 and 22.

Figure 18:
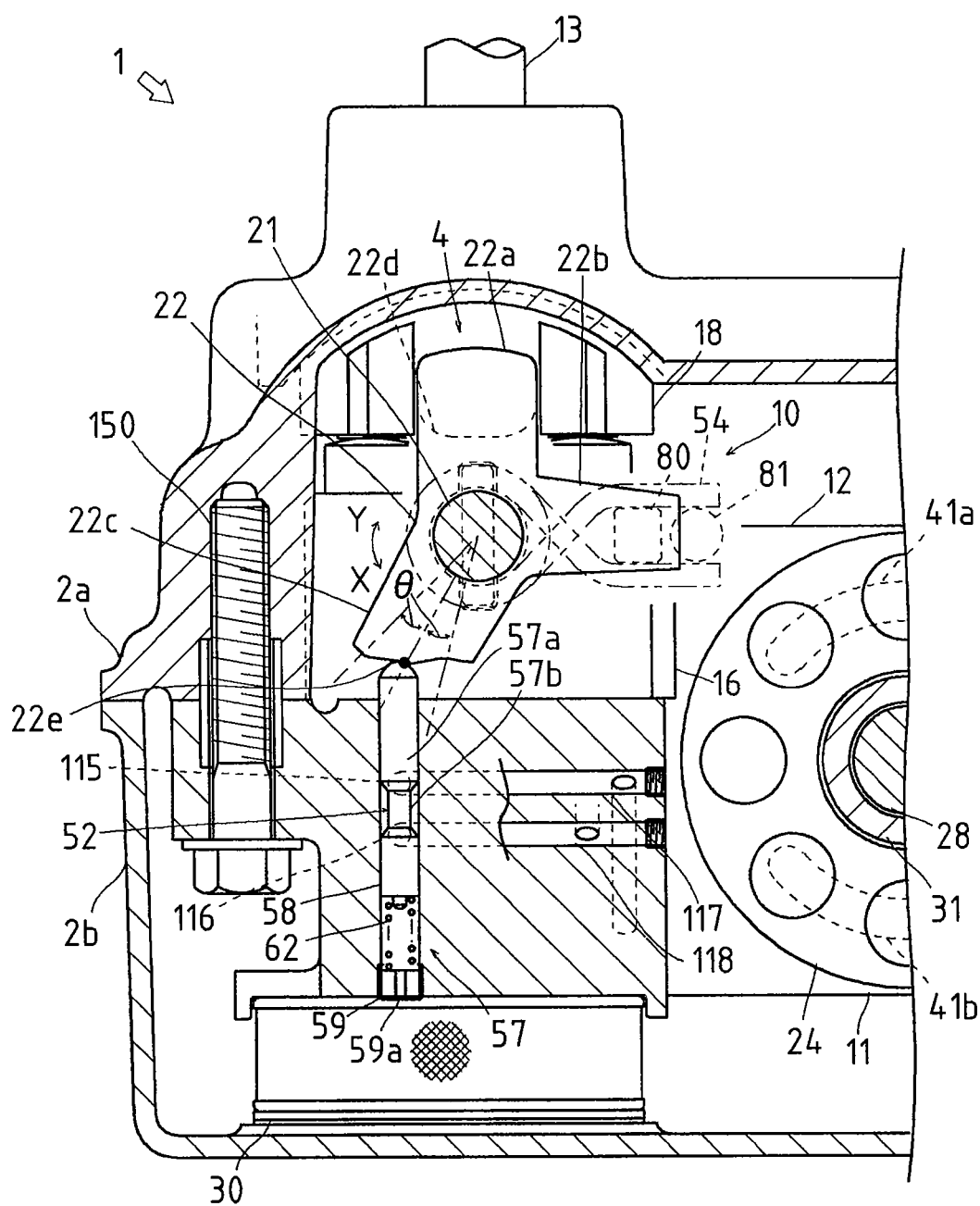
FIG. 18 is a fragmentary sectional side view of the IHT with a leak valve according to a fourth embodiment.
Figure 19:
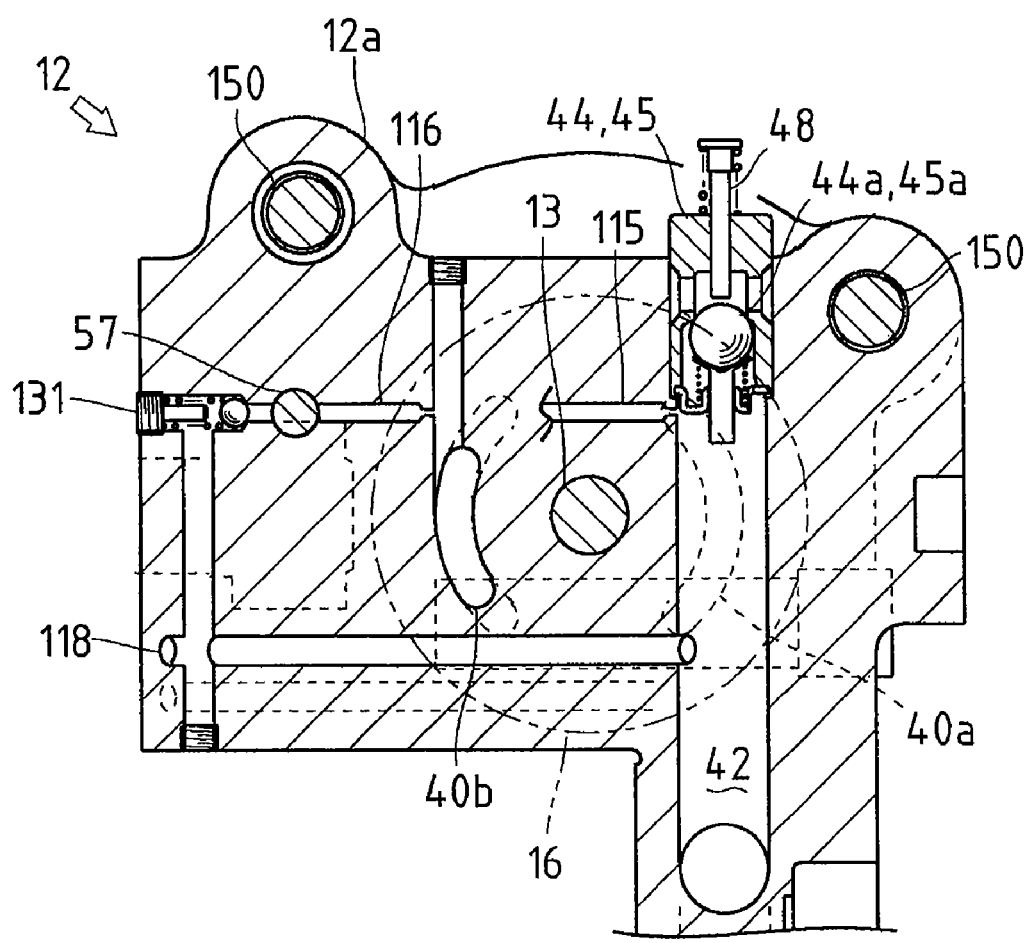
FIG. 19 is an enlarged sectional plan view of the center section with the leak valve according to the fourth embodiment.

IHT 1 including leak valve 57 with check valves 130 and 131 according to a fourth embodiment will be described with reference to FIGS. 18 to 22. As shown in FIGS. 18 and 19, the construction of leak valve 57 comprising valve member 57a slidably fitted in vertical valve chamber 58 formed in center section 12, and the construction of pump control arm 22 pressed against valve member 57a are similar to those in IHT 1 of the second embodiment shown in FIGS. 9 and 10.

Figure 20:
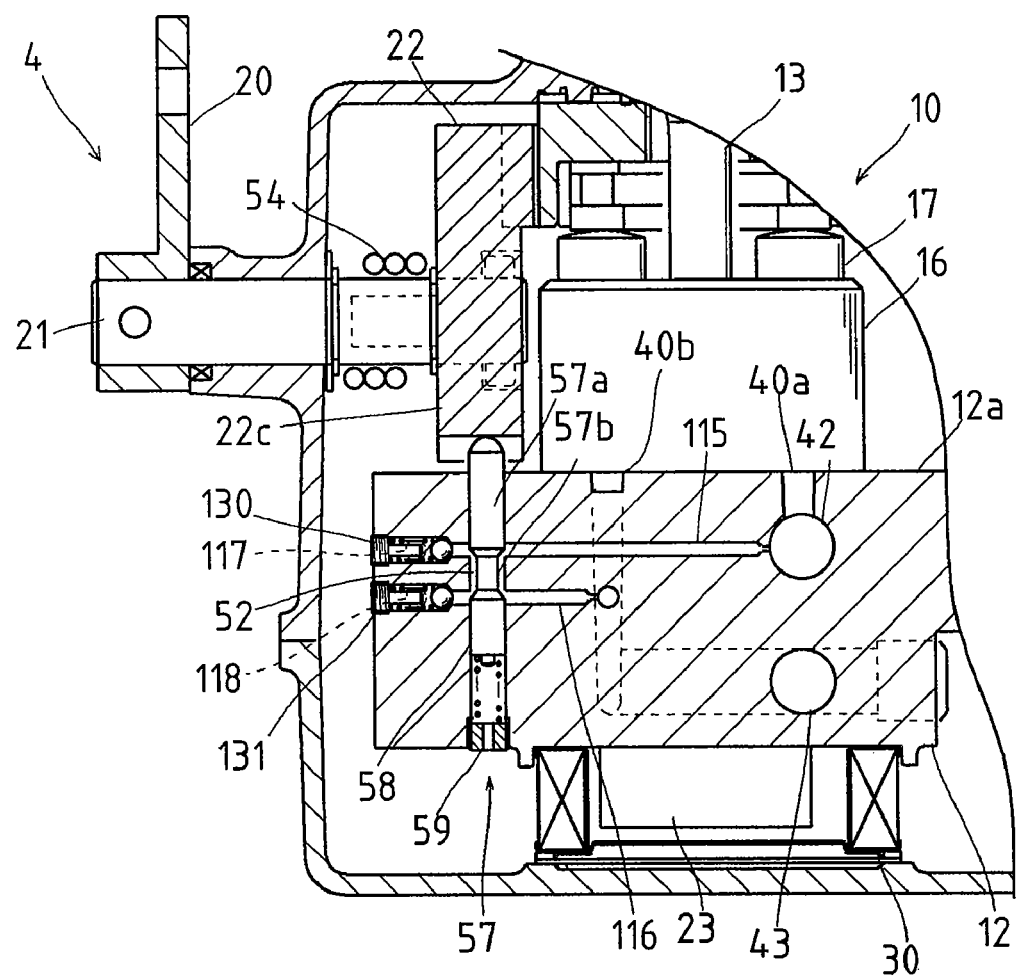
FIG. 20 is a fragmentary sectional rear view of the IHT with the leak valve according to the fourth embodiment.

As shown in FIG. 20, horizontal portion 12a of center section 12 is formed therein with horizontal upper and lower fluid ducts 115 and 116 extended from respective fluid ducts 42 and 43 to valve chamber 58. Junctions of fluid ducts 115 and 116 with respective fluid ducts 42 and 43 are formed into orifices, as shown in FIGS. 19 and 20. Valve member 57a is formed with vertically intermediate diametrically small portion 57b so as to ensure annular leak passage 52 therearound in valve chamber 58. When valve member 57a pressed against third arm portion 22c of inner pump control arm 22 is disposed at the neutral position, both the openings of fluid ducts 115 and 116 in valve chamber 58 are connected to leak passage 52; however, they are throttled by the upper and lower diametrically large portions of valve member 57a. Such throttled opening of both fluid ducts 115 and 116 to leak passage 52 ensures the expanded neutral zone of the HST, which is defined as a neutral position A of leak valve 57 in FIG. 22.

As shown in FIGS. 19 and 20, horizontal fluid ducts 115 and 116 are further extended straight through valve chamber 58, opening outward at the vertical outer side surface of horizontal portion 12a of center section 12, and are plugged at the outward openings thereof. Fluid ducts 115 and 116 are formed at portions adjacent to the plugged outward openings thereof as check valve chambers, in which respective check valves 130 and 131 are disposed. As shown in FIGS. 18 to 21, in horizontal portion 12a of center section 12, fluid duct 117 is formed from the check valve chamber of upper fluid duct 115 to lower fluid duct 43, and fluid duct 118 is formed from the check valve chamber of lower fluid duct 116 to upper fluid duct 42.

Figure 21:
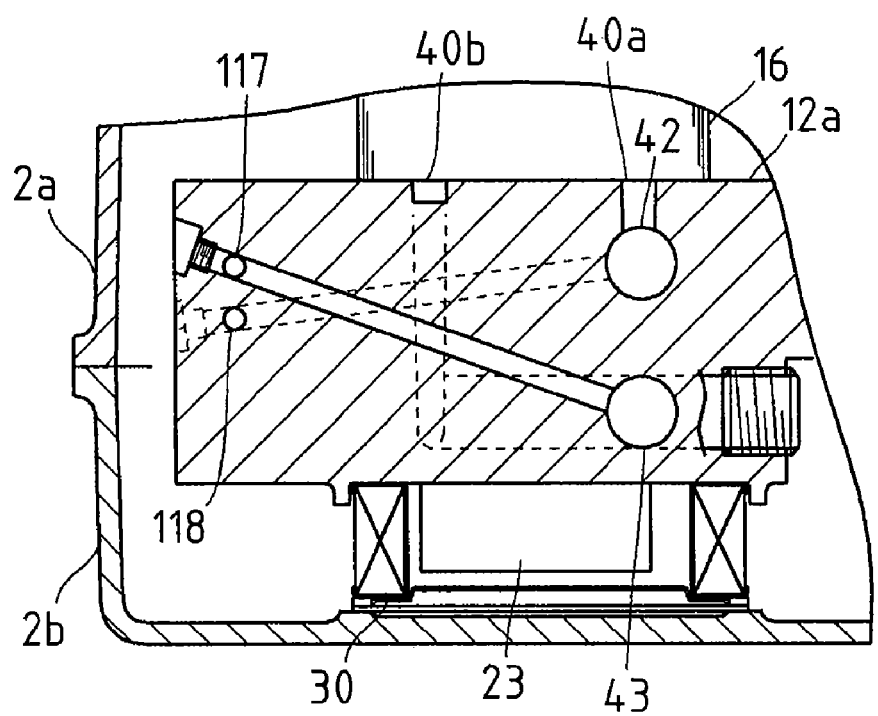
FIG. 21 is another fragmentary sectional rear view of the IHT with the leak valve according to the fourth embodiment.

Each of fluid ducts 117 and 118 has a horizontal portion and a slanted portion. As shown in FIGS. 18, 19 and 21, the upper and lower horizontal portions of fluid ducts 117 and 118 are extended in parallel to each other from the respective check valve chambers of fluid ducts 115 and 116 along the vertical outer side surface of center section 12. Ends of the horizontal portions of fluid ducts 117 and 118 opposite to the check valve chambers of fluid ducts 115 and 116 are open outward at another vertical outer side surface of horizontal portion 12 of center section 12, and plugged at the outward openings thereof.

As shown in FIG. 19, when viewed in plan, the slanted portions of fluid ducts 117 and 118 are extended in perpendicular to the horizontal portions of fluid ducts 117 and 118 from the horizontal portions of fluid ducts 117 and 118 adjacent to the plugged open ends thereof. When viewed in plan, the slant portions of fluid ducts 117 and 118 are extended in parallel adjacent to each other along the vertical outer side surface of center section 12, where the horizontal portions of fluid ducts 117 and 118 are open outward and plugged.

As shown in FIG. 21, when viewed in fore-and-aft direction, the slanted portion of fluid duct 117 is extended downwardly slantwise to lower fluid duct 43 open to kidney port 40b, and the slanted portion of fluid duct 118 is extended upwardly slantwise to upper fluid duct 42 open to kidney port 40a. When viewed in fore-and-aft direction, the slanted portions of fluid ducts 117 and 118 appear crossing each other, however, they are actually separate from each other.

Check valve 130 prevents fluid from flowing from fluid duct 117 to fluid duct 115, and allows fluid to flow from fluid duct 115 to fluid duct 117. Check valve 131 prevents fluid from flowing from fluid duct 118 to fluid duct 116, and allows fluid to flow from fluid duct 116 to fluid duct 118.

When the speed changing manipulator is operated for forward traveling so as to rotate pump control arms 20 and 22 in direction X from the neutral position, valve member 57a is pushed down by third arm portion 22c. At an early period of the rotation of pump control arms 20 and 22 from the neutral position, the open area of upper fluid duct 115 in valve chamber 58 is gradually reduced, and simultaneously, the open area of lower fluid duct 116 in valve chamber 58 is gradually increased, so that hydraulic pressure difference between fluid ducts 42 and 43 is gradually increased, thereby moderating forward traveling start of the vehicle. Afterward, the upper diametrically large portion of valve member 57a comes to cross upper fluid ducts 115 in valve chamber 58 so as to cut off fluid duct 115, thereby ensuring the proper hydraulic pressure in higher-pressurized fluid duct 42 determined by the tilt angle of swash plate 18. Simultaneously, the opening of lower fluid duct 116 in valve chamber 58 is entirely open to leak passage 52, thereby being connected to fluid duct 118 through check valve 131 (which is ready to be opened by increase of hydraulic pressure in fluid duct 43). This state of leak valve 57 is defined as a forward traveling position C in FIG. 22.

Figure 22:
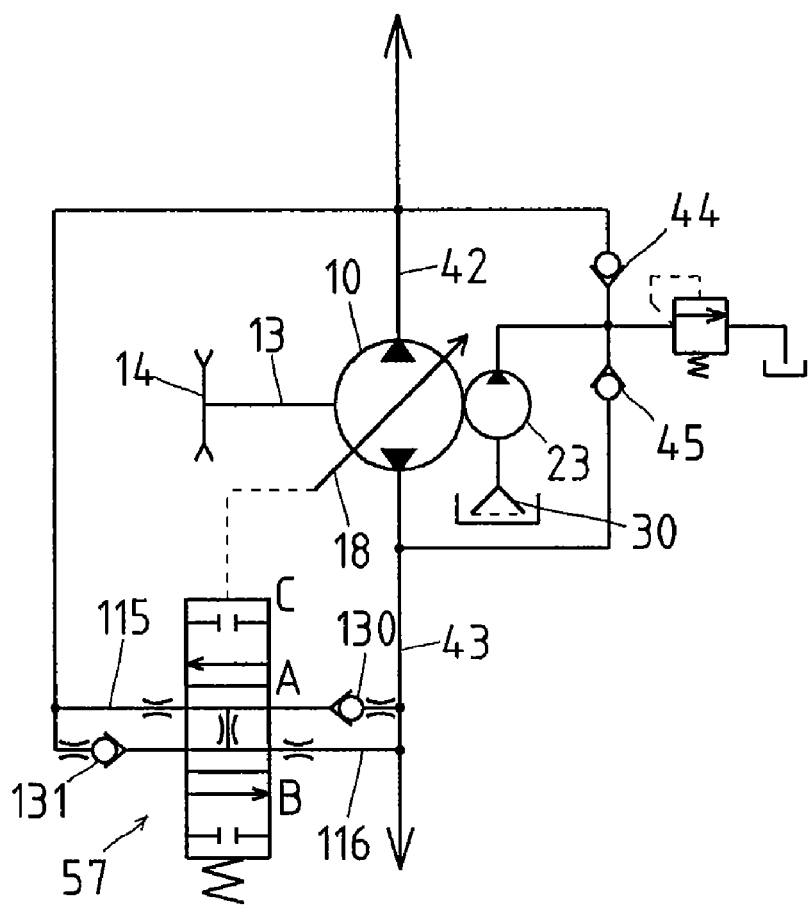
FIG. 22 is a diagram of a hydraulic circuit for the leak valve according to the fourth embodiment.

After leak valve 57 reaches forward traveling position C shown in FIG. 22, for the very moment that the speed changing manipulator is stopped at a target position so as to stop the increase of fluid delivered from hydraulic pump 10, accelerated hydraulic motor 11 is still going to increase its rotary speed by its inertial force, so that fluid duct 42 having been higher-pressurized becomes lower-pressurized, and fluid duct 43 having been lower-pressurized becomes higher-pressurized. Accordingly, check valve 131 is opened by increase of hydraulic pressure in fluid duct 43, and passes fluid from fluid duct 43 to fluid duct 42 through fluid ducts 116 and 118, thereby moderating stopping of acceleration of the vehicle.

When the speed changing manipulator is operated from a forward traveling speed position toward the neutral position for deceleration of the forward-traveling vehicle or stopping the vehicle, pump control arms 20 and 22 are rotated in direction Y. At the time of rotation of pump control arms 20 and 22 from a forward traveling speed position for reducing forward traveling speed, while leak valve 57 is disposed in forward traveling position C, hydraulic pressure in fluid duct 43 is increased so as to open check valve 131 for leaking the increased fluid from fluid duct 43 to fluid duct 42, thereby moderating hydraulic pressure change in the closed fluid circuit of the HST and preventing shock of the vehicle.

When the speed changing manipulator is operated for backward traveling so as to rotate pump control arms 20 and 22 in direction Y from the neutral position, valve member 57a is raised with third arm portion 22c. At an early period of the rotation of pump control arms 20 and 22 from the neutral position, the open area of upper fluid duct 115 in valve chamber 58 is gradually increased, and simultaneously, the open area of lower fluid duct 116 in valve chamber 58 is gradually reduced, so that hydraulic pressure difference between fluid ducts 42 and 43 is gradually increased, thereby moderating backward traveling start of the vehicle. Afterward, the lower diametrically large portion of valve member 57a comes to cross lower fluid ducts 116 in valve chamber 58 so as to cut off fluid duct 116, thereby ensuring the proper hydraulic pressure in higher-pressurized fluid duct 43 determined by the tilt angle of swash plate 18. Simultaneously, the opening of upper fluid duct 115 in valve chamber 58 is entirely open to leak passage 52, thereby being connected to fluid duct 117 through check valve 130 (which is ready to be opened by increase of hydraulic pressure in fluid duct 42). This state of leak valve 57 is defined as a backward traveling position B in FIG. 22.

After leak valve 57 reaches backward traveling position B shown in FIG. 22, for the very moment that the speed changing manipulator is stopped at a target position so as to stop the increase of fluid delivered from hydraulic pump 10, accelerated hydraulic motor 11 is still going to increase its rotary speed by its inertial force, so that fluid duct 43 having been higher-pressurized becomes lower-pressurized, and fluid duct 42 having been lower-pressurized becomes higher-pressurized. Accordingly, check valve 130 is opened by increase of hydraulic pressure in fluid duct 42, and passes fluid from fluid duct 42 to fluid duct 43 through fluid ducts 115 and 117, thereby moderating stopping of acceleration of the vehicle.

When the speed changing manipulator is operated from a backward traveling speed position toward the neutral position for deceleration of the backward-traveling vehicle or stopping the vehicle, pump control arms 20 and 22 are rotated in direction X. At the time of rotation of pump control arms 20 and 22 from a backward traveling speed position for reducing backward traveling speed, while leak valve 57 is disposed in backward traveling position B, hydraulic pressure in fluid duct 42 is increased so as to open check valve 130, thereby leak the increased fluid from fluid duct 42 to fluid duct 43, thereby moderating hydraulic pressure change in the closed fluid circuit of the HST and preventing shock of the vehicle.

Further, just before pump control arms 20 and 22 rotated from either forward or backward traveling speed position for deceleration reach the neutral position, leak valve 57 is opened (shifted to expanded neutral zone A) so as to bypass fluid between fluid ducts 42 and 43 through leak passage 52, thereby moderating stopping of the vehicle.

Figure 23:
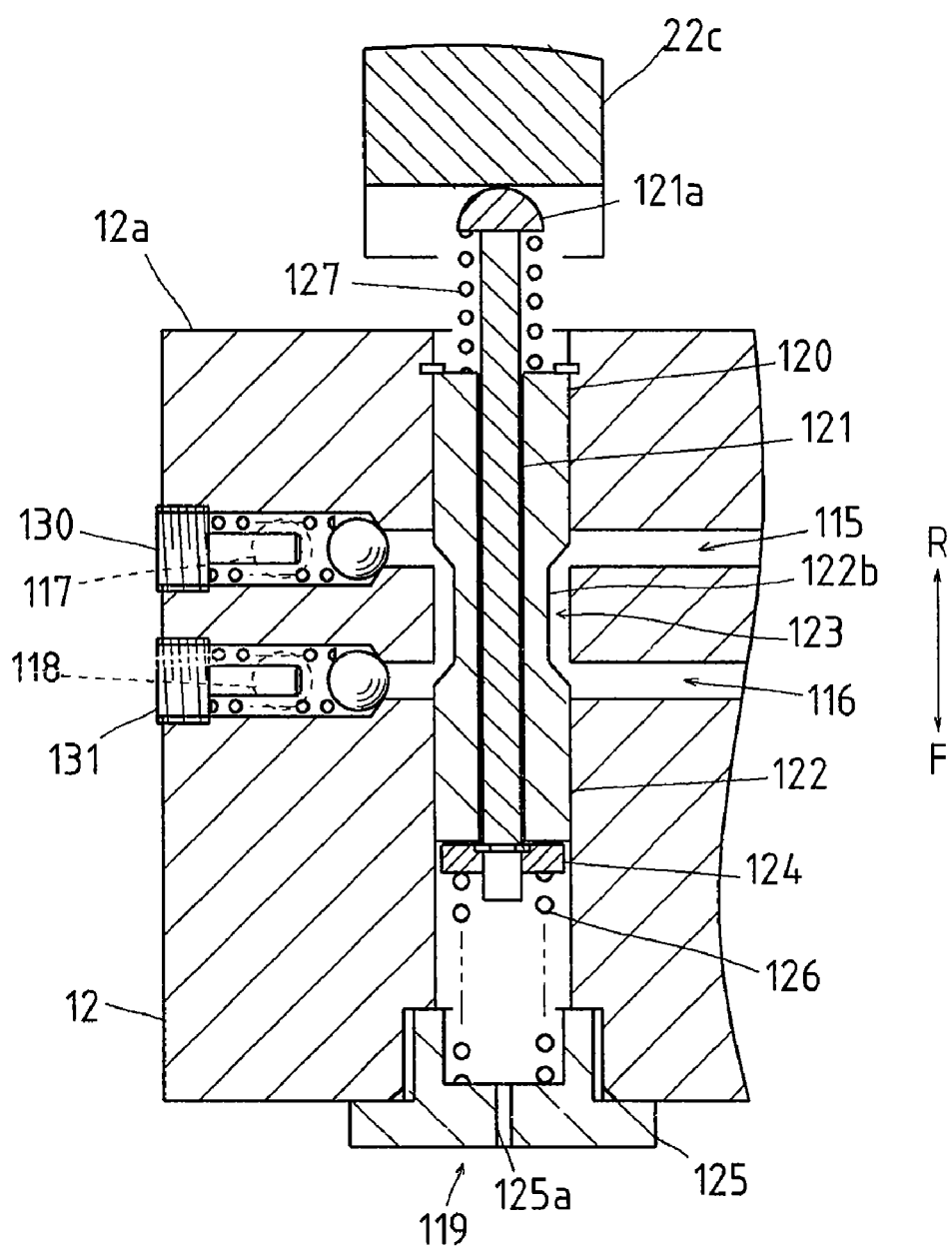
FIG. 23 is an enlarged sectional side view of a valve member of the modified leak valve according to the fourth embodiment.

Referring to FIG. 23, horizontal portion 12a of center section 12 is formed therein with leak fluid ducts 115, 116, 117 and 118 and check valves 130 and 131 according to the fourth embodiment. In an embodiment of FIG. 23 as modification of the fourth embodiment, a double-acting leak valve 119 is disposed in a vertical valve chamber 120 crossing horizontal fluid ducts 115 and 116, instead of leak valve 57 and valve chamber 58. Valve chamber 120 vertically penetrates horizontal portion 12a of center section 12. A bottom opening of valve chamber 120 is plugged by a plug 125 penetrated by a vertical orifice 125a so as to fluidly connect valve chamber 120 to the fluid sump in transaxle housing 2 out of center section 12.

A valve member (shaft) 121 of leak valve 119 is vertically slidably fitted in valve chamber 120. Valve member 121 includes a sleeve 122 and a shaft 121 vertically penetrating sleeve 122. Sleeve 122 has upper and lower diametrically large portions slidably and fluid-tightly fitted onto center section 12 in valve chamber 120. Sleeve 122 is narrowed or cut away so as to form a diametrically small portion 122b between the upper and lower diametrically large portions. An annular leak passage 123 is ensured in valve chamber 120 around diametrically small portion 122b of sleeve 122.

Shaft 121 projects upward from a top surface of sleeve 122 and the top open end of valve chamber 120. Shaft 121 is formed at a top thereof with a hemisphere head 121a pressed against the lower edge of third arm portion 22c of inner pump control arm 22. A damper spring 127 is coiled around shaft 121 between a horizontal bottom surface of head 121a and the horizontal top surface of sleeve 122, thereby constituting a lost motion system.

Further, shaft 121 projects downward from sleeve 122 in valve chamber 120. A retainer ring 124 is fixed onto the bottom portion of shaft 121 projecting downward from sleeve 122. A spring 126 is interposed between a horizontal surface of plug 125 and a horizontal bottom surface of retainer ring 124 in valve chamber 120 so as to upwardly bias sleeve 122 through retainer ring 124 abutting against the bottom surface of sleeve 122. With respect to sleeve 122, the upward biasing force of spring 126 exceeds the downward biasing force of damper spring 127 opposite to the force of spring 126, thereby biasing sleeve 122 to a neutral position (corresponding to neutral position A in FIG. 22), where the top surface of sleeve 122 abuts against a retainer ring fitted onto the inner peripheral surface of center section 12 in valve chamber 120.

When sleeve 122 is disposed at the neutral position, both fluid ducts 115 and 116 are opened to leak passage 123 in valve chamber 120; however, the open areas of fluid ducts 115 and 116 to leak passage 123 are throttled by the respective upper and lower diametrically large portions of sleeve 122.

When pump control arms 20 and 22 are rotated slowly in direction X (referring to FIG. 18) for forward traveling acceleration from the neutral position, third arm portion 22c is lowered so as to push down shaft 121, whereby the bottom portion of shaft 121 are further extended downward from the bottom surface of sleeve 122, thereby compressing spring 126. Due to the falling of shaft 121 and the compression of spring 126, the top surface of sleeve 122 is pushed down by head 121a of shaft 121 through damper spring 127, thereby lowering sleeve 122 together with shaft 121 in direction F. For an early period of the rotation of pump control arms 20 and 22 in direction X from the neutral position, leak valve 57 is still disposed in the expanded neutral zone A, where the open area of upper fluid duct 115 to leak passage 123 is gradually reduced and the open area of lower fluid duct 116 to leak passage 123 is gradually increased, thereby moderating forward traveling start of the vehicle. Finally, the upper diametrically large portion of sleeve 122 comes to cross upper fluid duct 115 so as to cut off fluid duct 115, thereby ensuring proper hydraulic pressure in higher-pressurized fluid duct 42 determined by the tilt angle of swash plate 18 of hydraulic pump 10. Simultaneously, leak passage 123 comes to cross fluid duct 116, i.e., fluid duct 116 is entirely opened to leak passage 123. This state of leak valve 119 is defined as forward traveling position C in FIG. 22.

When pump control arms 20 and 22 are rotated rapidly in direction X, shaft 121 falls rapidly. Spring 126 is compressed by falling shaft 121, and damper spring 127 is also compressed because its force is smaller than the opposite force of spring 126. As a result, the falling of sleeve 122 pushed down by spring 127 is delayed after the falling of shaft 121, thereby keeping the slow shift of leak valve 119 from neutral position A to forward traveling position C, i.e., moderating forward traveling start of the vehicle, regardless of the rapid speed changing operation.

If pump control arms 20 and 22 are rotated in direction Y for decelerating forward traveling speed toward the neutral position, increased hydraulic pressure in fluid duct 43 opens check valve 131 so as to leak the increased fluid from fluid duct 43 to fluid duct 42, thereby moderating deceleration of the forward-traveling vehicle.

Description will now be given on modified IHT 1 and hydraulic transaxles 201 suitable for a four-wheel drive vehicle, with reference to FIGS. 24 to 29.

Figure 24:
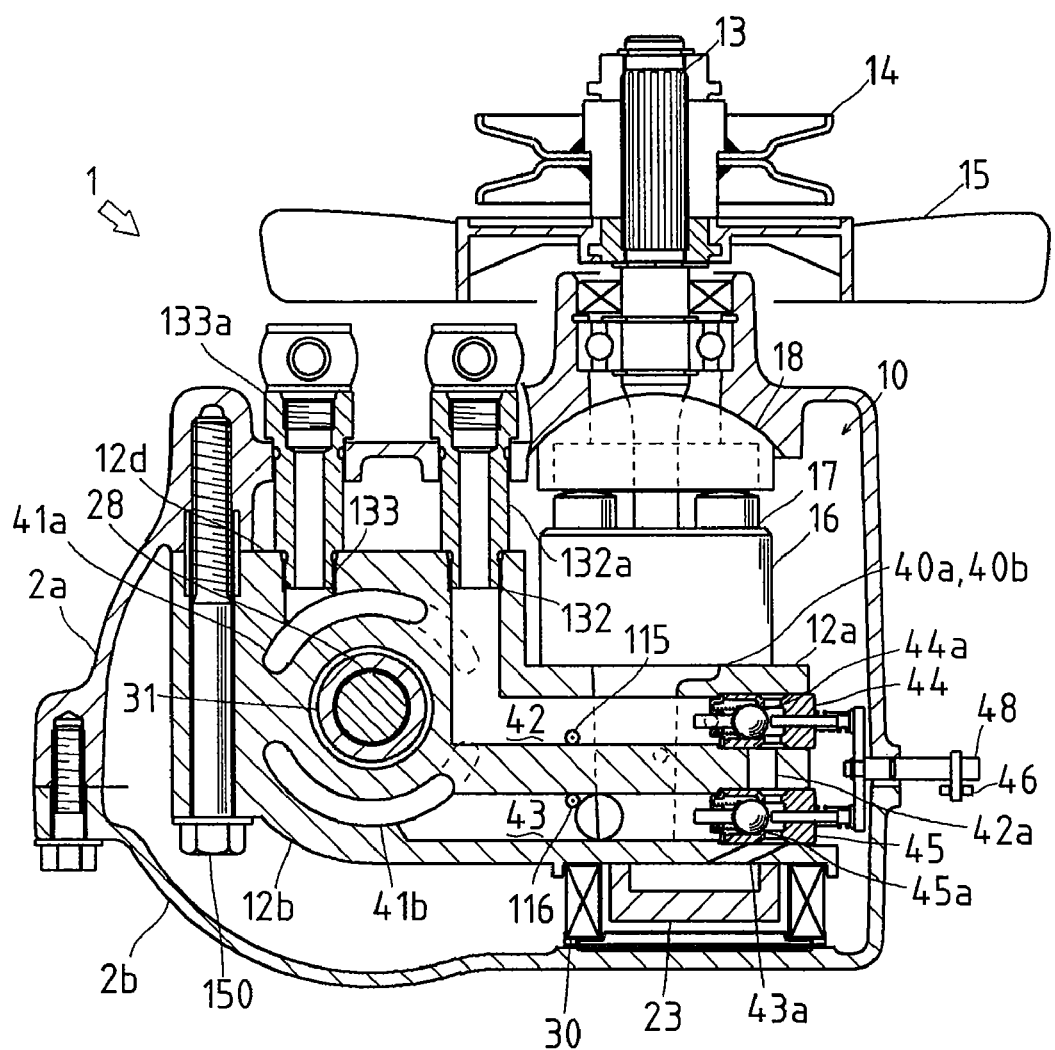
FIG. 24 is a sectional side view of the IHT modified to be applied for a four-wheel drive vehicle.

Referring to FIG. 24, IHT 1 is the same as IHT 1 shown in FIGS. 1 to 5, excluding that center section 12 and upper housing half 2a are modified to suit a four-wheel drive vehicle. The same points and differences are understood best from comparison of FIG. 24 with FIG. 2. Description of the same parts designated by the same reference numerals is omitted.

Referring to FIG. 24, horizontal fluid duct 42 connected to kidney port 40a is bent upward in vertical portion 12b of center section 12 so as to serve as a vertical fluid duct 132, which is separated from kidney port 40a. FIG. 2 also illustrates a similar vertical fluid duct formed in vertical portion 12b of center section 12 and extended to fluid duct 42. However, the vertical fluid duct in vertical portion 12b shown in FIG. 2 is connected to kidney port 41a. Vertical portion 12b of center section 12 has a horizontal top surface 12d, where vertical fluid duct 132 is open upward. A connection port member 132a having a downwardly open vertical hole is fitted at a bottom end thereof into the upward open end of fluid duct 132 so as to connect the vertical hole to fluid duct 132. Connection port member 132a penetrates a ceiling wall of upper housing half 2a and projects upward therefrom. A piping from one port of a hydraulic motor (not shown, hereinafter referred to as a second hydraulic motor) for driving an axle (not shown) other than axles 28 is connected to a top portion of connection port member 132a above upper housing half 2a, so as to fluidly connect kidney port 40a of hydraulic pump 10 to the one port of the second hydraulic motor.

Referring to FIG. 24, a vertical fluid duct 133 is formed in vertical portion 12b of center section 12 in parallel to fluid duct 132. Fluid duct 133 is connected at a bottom end thereof to kidney port 41a and opens upward at horizontal top surface 12d of center section 12. A connection port member 133a having a downwardly open vertical hole is fitted at a bottom end thereof into the upward open end of fluid duct 133 so as to connect the vertical hole to fluid duct 133. Connection port member 133a penetrates the ceiling wall of upper housing half 2a and projects upward therefrom. A piping from the other port of the second hydraulic motor is connected to a top portion of connection port member 133a above upper housing half 2a, so as to fluidly connect the other port of the second hydraulic motor to kidney port 41a of hydraulic motor 11.

Referring to FIG. 24, fluid duct 43 is interposed between kidney port 41b of hydraulic motor 11 and kidney port 40b of hydraulic pump 10, similar to that of FIG. 2. In this way, the HST (hydraulic pump 10 and motor 11) in IHT 1 can be fluidly connected to the second hydraulic motor in another transaxle so that hydraulic motor 11 and the second hydraulic motor are fluidly connected in series to hydraulic pump 10.

Figure 27:
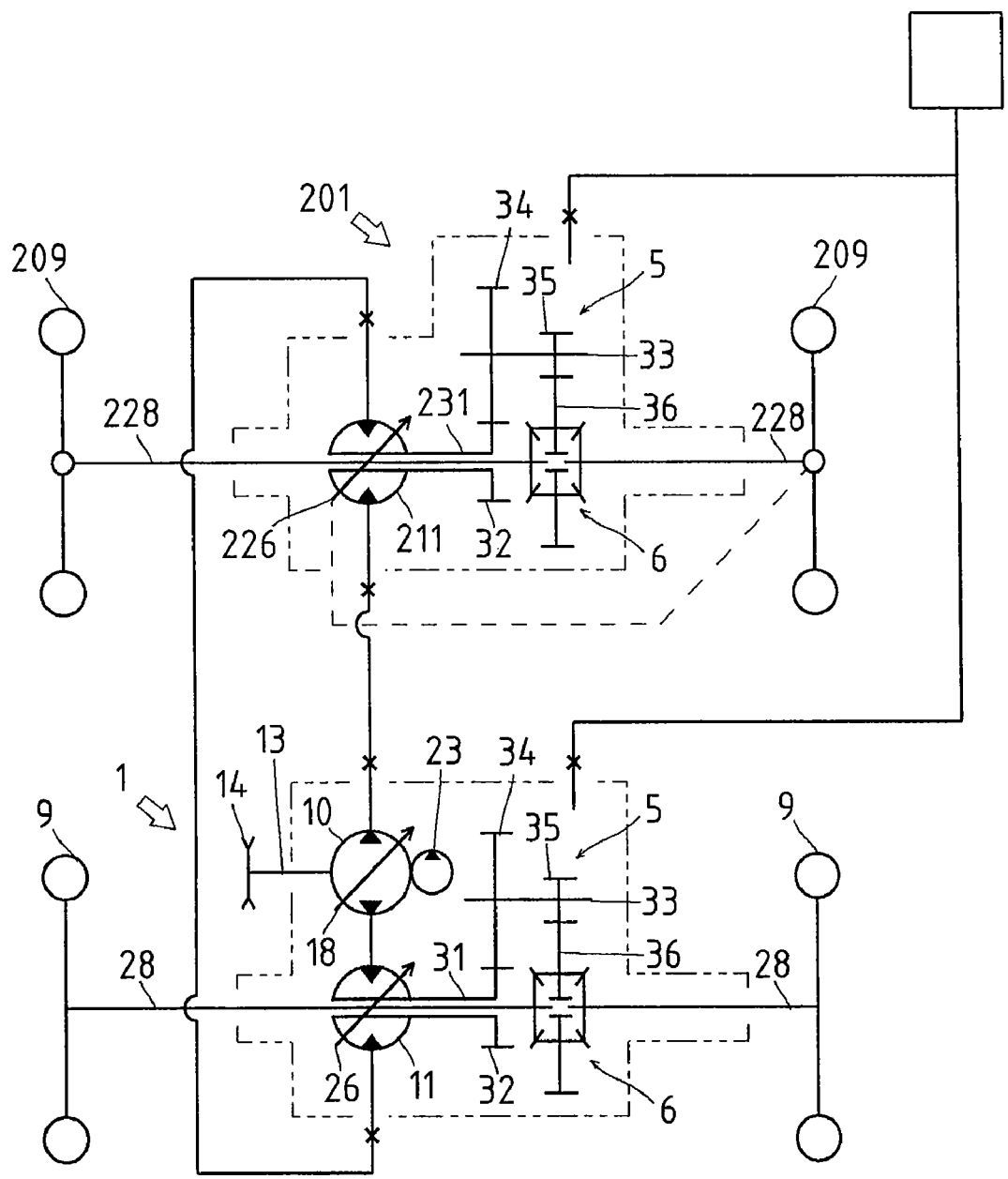
FIG. 27 is a circuit diagram of a hydraulic drive system for a four-wheel drive vehicle, including the IHT and the second transaxle.

Referring to FIG. 27, a four-wheel drive vehicle is provided with IHT 1 containing hydraulic motor 11 for driving either rear or front wheels 9, and with a second transaxle 201 containing a hydraulic motor 211 for driving axles 228 of the other front or rear wheels 209. IHT 1 contains hydraulic pump 10 fluidly connected to hydraulic motor 11. IHT 1 is modified as shown in FIG. 24 so as to make hydraulic pump 10 supply fluid to hydraulic motor 211 of second transaxle 201.

A transaxle housing 202 of second transaxle 201 includes halves directly joined to each other through a joint surface in parallel to axes of axles 228, similar to transaxle housing 2 of IHT 1. In a first embodiment of transaxle 201 shown in FIGS. 25 and 26, transaxle housing 202 includes an upper half 202a and a lower half 202b directly joined to each other by bolts through a horizontal joint surface parallel to axles 228. Alternatively, transaxle housing 202 may include halves directly joined to each other by bolts through a joint surface in perpendicular to axes of axles 228. In a second embodiment of transaxle 201 shown in FIGS. 28 and 29, transaxle housing 202 includes right and left halves 202c and 202d joined to each other through a vertical joint surface perpendicular to axles 228. Anyway, transaxle housing 202 has only one joint surface between the halves (halves 202a and 202b or halves 202c and 202d) to be oil-sealed, thereby having high fluid-tightness.

As shown in FIGS. 25 to 29, a hydraulic motor 211 and a center section 212 are disposed in transaxle housing 202 (of either the first or second embodiment). Deceleration gear train 5, differential gear unit 6, brake 7 and the like are disposed in transaxle housing 202, similar to those in transaxle housing 2. Transaxle housing 202 is filled with fluid serving as operation fluid for hydraulic motor 211 and lubrication fluid for gears and the like. Parts in FIGS. 25 to 29 designated by the same reference numerals as those of IHT 1 are identical to those in IHT 1, and description thereof will be omitted.

Figure 25:
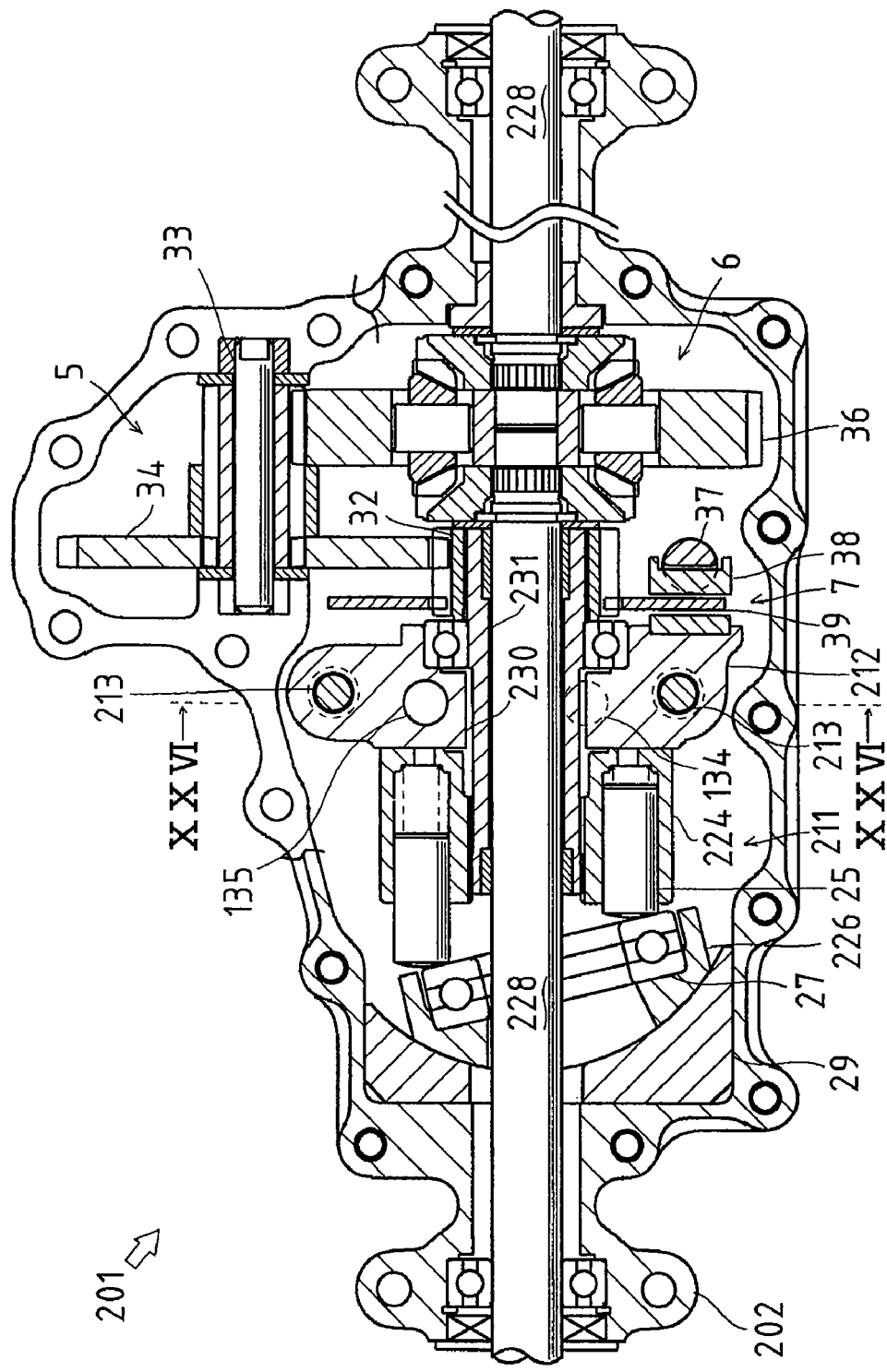
FIG. 25 is a plan view partly in section of a second transaxle according to a first embodiment.
Figure 26:
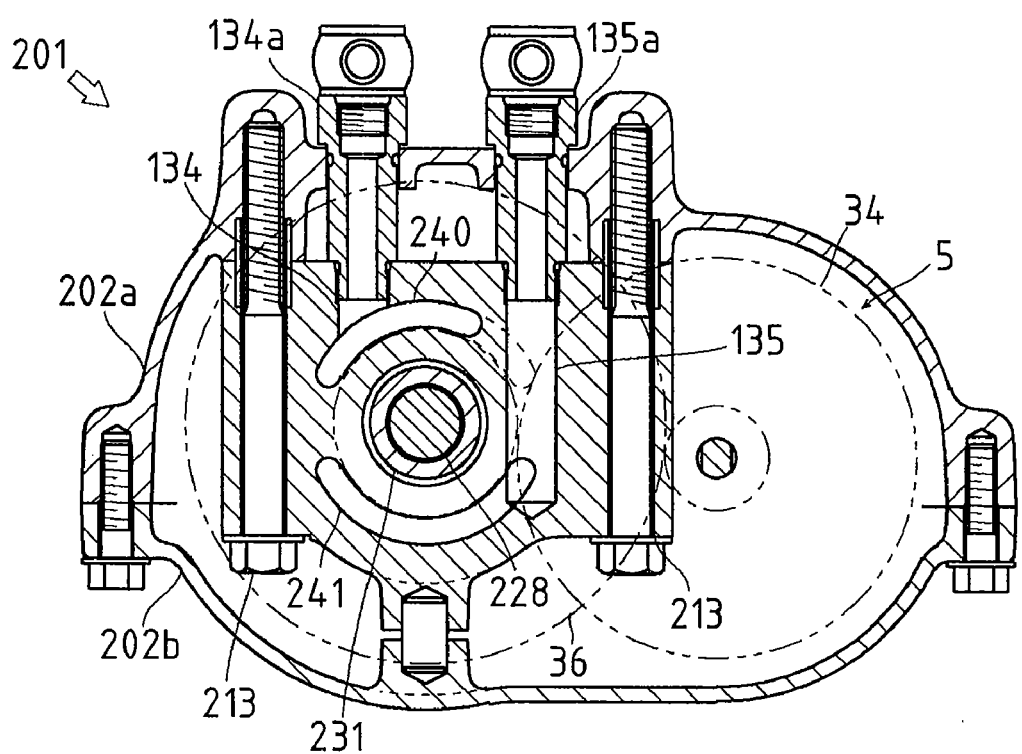
FIG. 26 is a cross sectional view taken along XXVI-XXVI line of FIG. 25.

In the first embodiment of transaxle 201 shown in FIGS. 25 and 26, center section 212 is a substantially square vertical plate-like member fastened to upper housing half 202a by upwardly screwed front and rear vertical bolts 213. In the second embodiment of transaxle 201 shown in FIGS. 28 and 29, center section 212 is a substantially circular plate-like member having bolt-hole tabs triangularly arranged when viewed in the axial direction of axles 228. The bolt-hole tabs of center section 212 are fitted to corresponding bolt-hole tabs formed of housing half 202d, and bolts 214 are horizontally screwed through the bolt-holes of center section 212 and housing half 202d, thereby fastening center section 212 to housing half 202d.

Figure 28:
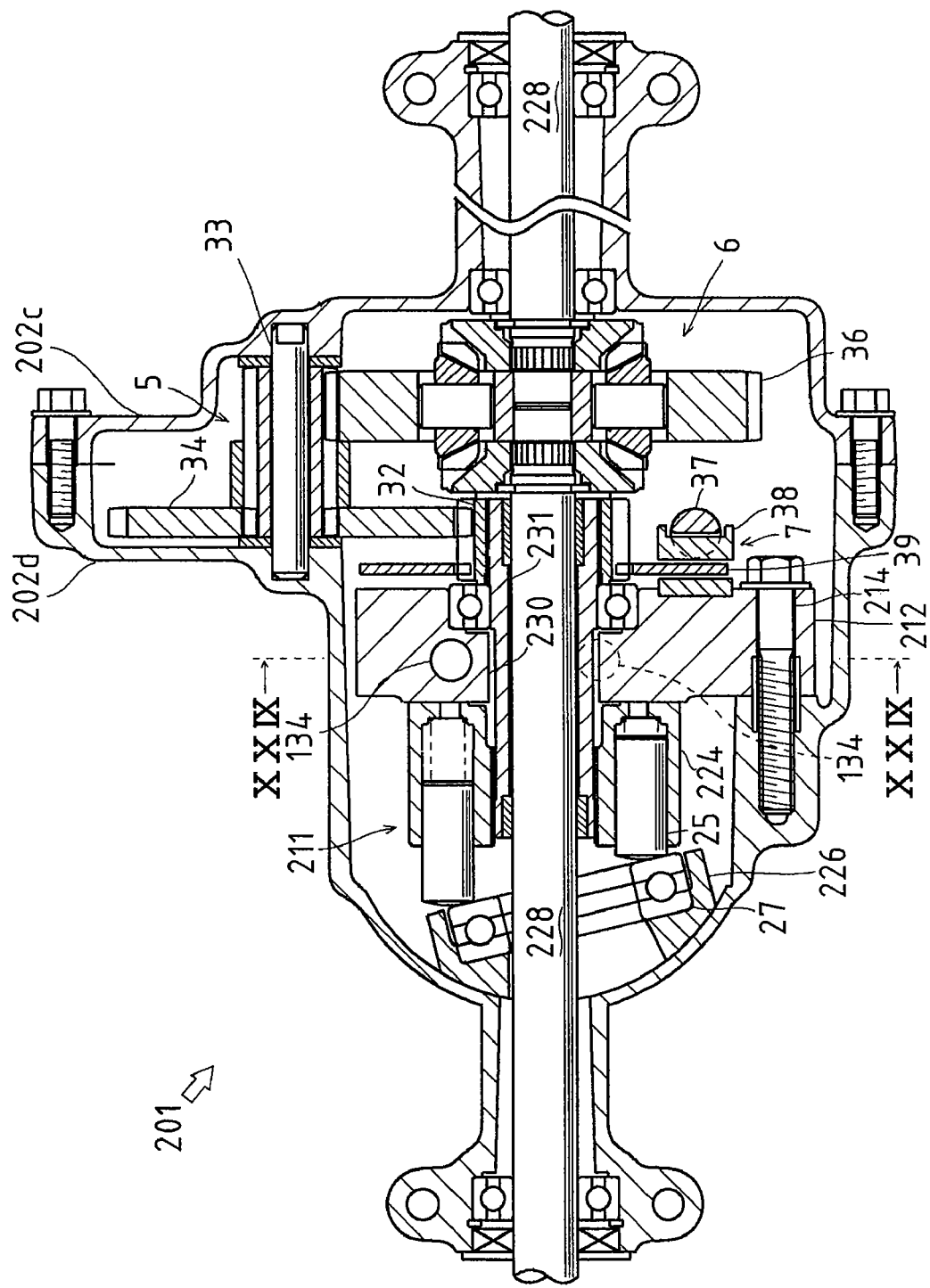
FIG. 28 is a plan view partly in section of a second transaxle according to a second embodiment.
Figure 29:
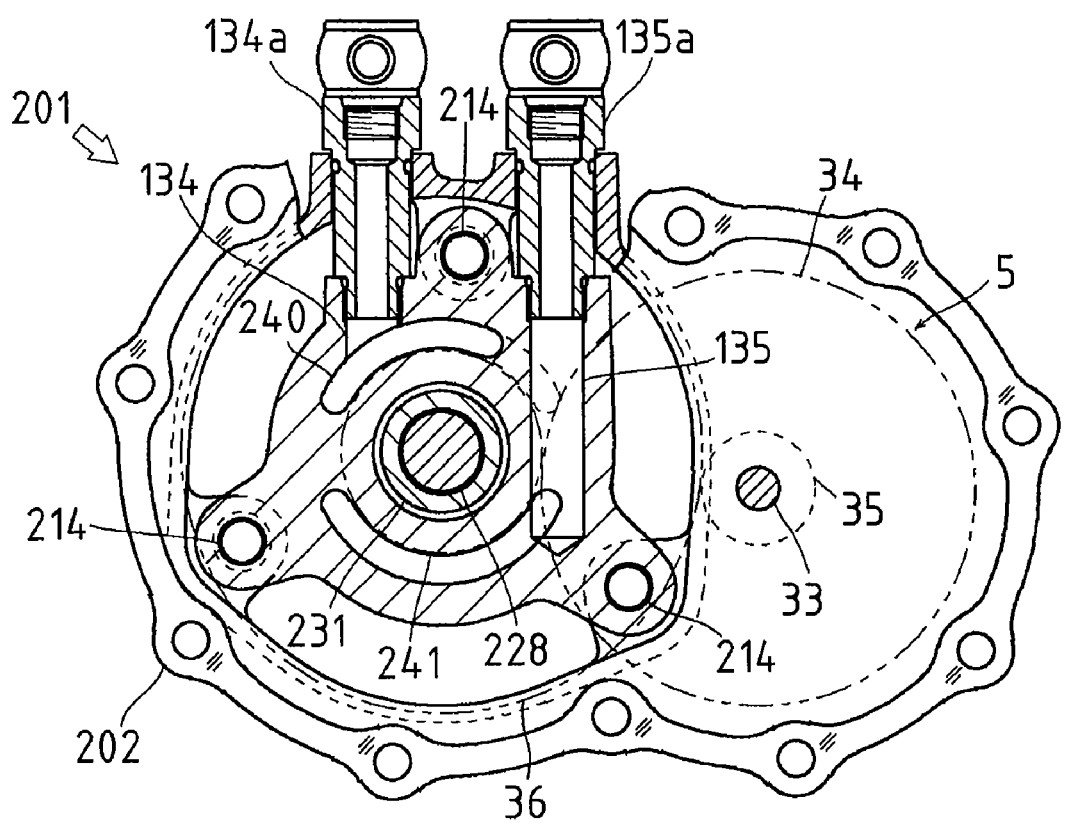
FIG. 29 is a cross sectional view taken along XXIX-XXIX line of FIG. 25.

In each of transaxles 201 shown in FIGS. 25 and 26 and in FIGS. 28 and 29, a pair of upper and lower kidney ports 240 and 241 are bored in center section 212 and outwardly open at one vertical outer side surface of center section 212 opposite to differential gear unit 6. A pair of parallel vertical fluid ducts 134 and 135 are bored in center section 212. Bottom portions of fluid ducts 134 and 135 in center section 212 are connected at bottom portions thereof to respective upper and lower kidney ports 240 and 241. Fluid ducts 134 and 135 are open upward at a horizontal top surface of center section 212. A pair of connection port members 134a and 135a are fitted at bottom ends thereof into the top openings of fluid ducts 134 and 135. Connection port members 134a and 135a have vertical holes downwardly open to connect to respective fluid ducts 134 and 135. Heads of connection port members 134a and 135a project upward from upper housing half 202a. A piping from one port of hydraulic pump 10 is connected to the head of one of connection port members 134a and 135a, and a piping from one port of hydraulic motor 11 is connected to the head of the other connection port member 135a or 134a, thereby fluidly connect hydraulic motor 211 to hydraulic pump 10 and hydraulic motor 11. The piping may be flexible. In this way, axle 228 of second transaxle 201 can be supplied with driving power from IHT 1 for driving axles 28, whereby a mechanical transmission system such as a propeller shaft does not have to be interposed between the front and rear transaxles. Therefore, a large space for a working machine such as a mower unit can be ensured at a fore-and-aft intermediate portion of the vehicle.

In each of transaxles 201 shown in FIGS. 25 and 26 and in FIGS. 28 and 29, a cylinder block 224 of hydraulic motor 211 is slidably rotatably fitted onto the vertical outer side surface of center section 212 at which kidney ports 240 and 241 are open. A cylindrical motor shaft 231 is axially and not-relatively rotatably fitted to cylinder block 224, rotatably passed through a horizontal shaft hole 230 penetrating center section 212, and extended outward from center section 212 to the vicinity of differential gear unit 6. One of axles 228 extended from differential gear unit 6 relatively rotatably penetrates motor shaft 231. In this regard, axially opposite bushes (bearings) are disposed in motor shaft 231 so as to rotatably support axle 228 relative to motor shaft 231.

In each of transaxles 201 shown in FIGS. 25 and 26 and in FIGS. 28 and 29, a movable swash plate 226 is rotatably fitted in transaxle housing 202. Thrust bearing 27 is fitted on swash plate 226 and abuts against heads of horizontal pistons slidably fitted in cylinder block 224. Hydraulic motor 211 shown in FIGS. 25 and 26 and hydraulic motor 211 shown in FIGS. 28 and 29 are axial piston type hydraulic motors. Alternatively, hydraulic motor 211 may be a radial piston type hydraulic motor.

In the first embodiment of transaxle 201 shown in FIGS. 25 and 26, movable swash plate 226 is slidably fitted to the arcuately recessed surface of guide support 29 fixedly clamped between upper and lower housing halves 202a and 202b. In the second embodiment of transaxle 201 shown in FIGS. 28 and 29, movable swash plate 226 is slidably fitted to an arcuate inner surface of housing half 202d. In this way, swash plate 226 shown in FIGS. 25 and 26 and swash plate 226 shown in FIGS. 28 and 29 are cradle type movable swash plates. Alternatively, transaxle 201 may be provided with a trunnion type movable swash plate.

Axle 228 penetrating motor shaft 231 is freely rotatably passed through thrust bearing 27 and swash plate 226 (and guide support 29), and extended laterally outward from transaxle housing 202 so as to be drivingly connected at an outer end thereof to drive wheel 209 (see FIG. 27). The other opposite axle 228 is also extended laterally outward from transaxle housing 202 and drivingly connected at an outer end thereof to drive wheel 209.

Drive wheels 209 are steerable wheels. In this regard, a steering system of the four-wheel drive vehicle shown in FIG. 27 having IHT 1 and transaxle 201 can be Ackerman steering system or an articulate steering system. Hydraulic motor 211 is variable in displacement for changing rotary speed of wheels 209 relative to that of wheels 9 during turning of the vehicle, thereby preventing braking phenomenon during turning of the vehicle, i.e., drag of wheels 9 or 209. Movable swash plate 226 is tilted based on detection of turning angle of wheels 209, so as to change the displacement of hydraulic motor 211 during turning of the vehicle. If distances of wheels 209 from a turning center of the vehicle become smaller than those of wheels 9 from the turning center of the vehicle, hydraulic motor 211 is accelerated according to increase of the turning angle of wheels 209. If distances of wheels 209 from a turning center of the vehicle become larger than those of wheels 9 from the turning center of the vehicle, hydraulic motor 211 is decelerated according to increase of the turning angle of wheels 209.

If distances of wheels 209 from the turning center of the vehicle are equal to distances of wheels 9 from the turning center of the vehicle during turning of the vehicle, the rotary speed of wheels 209 do not have to change relative to that of wheels 9. In this case, hydraulic motor 211 may be fixed in displacement, and may be provided with a fixed swash plate.

Although the invention has been described in its preferred form with a certain degree of particularity, it is understood that the present disclosure of the preferred form can be changed in the details of construction, and the combination and arrangement of parts may be changed, without departing from the spirit and the scope of the invention as hereinafter claimed.

What is claimed is:
1. A hydraulic transaxle comprising:
a housing forming a fluid sump;
a pair of axles disposed in the housing;
a differential unit disposed in the housing so as to differentially connect the axles to each other;
a hydraulic pump disposed in the housing, the pump having a pump shaft extended from the housing;
a hydraulic motor disposed in the housing, the motor having a motor shaft;
a motor output gear being non-relatively rotatably fitted on the motor shaft and drivingly connected to the axles;
a diametrically large gear meshing with the motor output gear;
a diametrically small gear meshing with a bull gear of the differential gear unit 6, wherein the large gear is non-relatively rotatably fitted onto diametrically the small gear;

a counter shaft coaxially supporting the large and the small gear, the counter shaft axially having one end and the other end; and a center section detachably fixed in the housing and fluidly communicating the pump and the motor, the center section having a pump mounting surface and a motor mounting surface at a right angle to each other, whereby the pump shaft of the pump extends perpendicularly to the axles, and the motor shaft of the motor extends parallel to the axles, wherein an opening though which the motor shaft extends is formed in a surface opposite of the motor mounting surface of the center section, and wherein a support portion is formed by the center section, the one end of the counter shaft being inserted into and supported by the support portion and the other end of the counter shaft being supported by the housing.

2. A hydraulic transaxle according to claim 1, wherein the counter shaft extends perpendicularly to the pump shaft of the pump.

3. A hydraulic transaxle comprising:

a housing forming a fluid sump;

an axle disposed in the housing;

a hydraulic pump disposed in the housing, the pump having a pump shaft extended from the housing;

a hydraulic motor disposed in the housing, the motor having a motor shaft;

a motor output gear a being non-relatively rotatably fitted on the motor shaft and drivingly connected to the axle;

a diametrically large gear a meshing with the motor output gear;

a diametrically small gear meshing with a bull gear drivingly connected to the axle, wherein the large gear is non-relatively rotatably fitted onto diametrically the small gear;

a counter shaft coaxially supporting the large and the small gear, the counter shaft axially having one end and the other end; and a center section detachably fixed in the housing and fluidly communicating the pump and the motor, the center section having a pump mounting surface and a motor mounting surface at a right angle to each other, whereby the pump shaft of the pump extends perpendicularly to the axle, and the motor shaft of the motor extends parallel to the axle, wherein an opening though which the motor shaft extends is formed in a surface opposite of the motor mounting surface of the center section, and wherein a support portion is formed by the center section, the one end of the counter shaft being inserted into and supported by the support portion and the other end of the counter shaft being supported by the housing.

4. A hydraulic transaxle according to claim 3, wherein the counter shaft extends perpendicularly to the pump shaft of the pump.

* * * * *